United States Patent
Uchida et al.

(10) Patent No.: US 8,245,275 B2
(45) Date of Patent: Aug. 14, 2012

(54) ELECTRONIC DEVICE, NON-TRANSITORY COMPUTER-READABLE MEDIUM STORING PROGRAM, AND CIRCUIT CHIP

(75) Inventors: Hiroyuki Uchida, Kawasaki (JP); Isamu Shida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1144 days.

(21) Appl. No.: 11/528,366

(22) Filed: Sep. 28, 2006

(65) Prior Publication Data

US 2007/0253261 A1 Nov. 1, 2007

(30) Foreign Application Priority Data

Apr. 18, 2006 (JP) .................................. 2006-114832

(51) Int. Cl.
*G06F 13/00* (2006.01)
(52) U.S. Cl. .......................................................... 726/2
(58) Field of Classification Search .................... 726/11, 726/2; 380/301; 710/100, 107, 110, 11, 710/305–315
See application file for complete search history.

(56) References Cited

U.S. PATENT DOCUMENTS

| | | | |
|---|---|---|---|
| 6,415,342 B1* | 7/2002 | Wahl et al. ..................... | 710/100 |
| 6,625,761 B1* | 9/2003 | Sartore et al. ................... | 714/43 |
| 6,690,614 B2 | 2/2004 | Nagata et al. | |
| 6,738,834 B1* | 5/2004 | Williams et al. .................. | 710/8 |
| 7,133,938 B2 | 11/2006 | Nagao | |
| 7,237,046 B2* | 6/2007 | Paley et al. ..................... | 710/38 |
| 2001/0017846 A1* | 8/2001 | Wu ................................ | 370/257 |
| 2004/0189808 A1* | 9/2004 | Tanaka ........................ | 348/207.1 |
| 2004/0193744 A1* | 9/2004 | Paley et al. ...................... | 710/5 |
| 2007/0053513 A1* | 3/2007 | Hoffberg ....................... | 380/201 |

FOREIGN PATENT DOCUMENTS

| | | |
|---|---|---|
| CN | 1170372 C | 5/2003 |
| JP | 04-277812 | 10/1992 |
| JP | 11-025024 A | 1/1999 |
| JP | 2001-256170 A | 9/2001 |
| JP | 2003-100876 | 4/2003 |
| JP | 2003-256349 A | 9/2003 |
| JP | 2005-123843 A | 5/2005 |
| JP | 2005-130339 A | 5/2005 |

OTHER PUBLICATIONS

Chinese Office Action dated Jul. 4, 2008, issued in corresponding Chinese Patent Application No. 200610141449.5.
"Japanese Office Action" mailed by JPO and corresponding to JP Patent Appl. No. 2006-114832 on Apr. 12, 2011, with English translation.
Japanese Office Action mailed Jan. 31, 2012 for corresponding Japanese Application 2006-114832, with partial English-language translation.

* cited by examiner

*Primary Examiner* — Edward Zee
(74) *Attorney, Agent, or Firm* — Fujitsu Patent Center

(57) ABSTRACT

The present invention relates to data transfer to an external storage device disposed on or connected to an electronic device and can accelerate the data transfer. The present invention relates to an electronic device (portable terminal device) connected or disposed with an external storage device, includes a transmission channel connected to an external device (personal computer) that is a data source to transmit data, and simplifies a data transmission path intervening between the transmission path and the external storage device to accelerate the data transfer and accelerate the writing of data into the external storage device.

7 Claims, 21 Drawing Sheets

ELECTRONIC DEVICE, NON-TRANSITORY COMPUTER-READABLE MEDIUM STORING PROGRAM, AND CIRCUIT CHIP

CROSS-REFERENCE TO RELATED APPLICATIONS

This application is based upon and claims the benefit of priority from the prior Japanese Patent Application No. 2006-114832, filed on Apr. 18, 2006, the entire contents of which are incorporated herein by reference.

BACKGROUND OF THE INVENTION

1. Field of the Invention

The present invention relates to an electronic device disposed or connected with an external storage device such as the SD (Secure Digital) memory card and, particularly, relates to an electronic device, a data transfer controlling method thereof, a data transfer controlling program thereof, a circuit chip, a circuit device, and a data transfer system that can use an interface function of USB (Universal Serial Bus), etc., to transfer data to an external storage device for writing of data.

2. Description of the Related Art

In a method of writing application data, etc., externally into an external storage device disposed on a portable terminal device such as a cellular phone, the portable terminal device is connected to a personal computer (PC) and the data to be written are loaded from the PC to the portable terminal device and written into the external storage device.

With regard to such data transfer, in the disclosure of Japanese Patent Application Laid-Open Publication No. 2005-130339, a cellular phone is connected to a PC to transfer image data, etc., (paragraph No. 0030, FIG. 1), and in the disclosure of Japanese Patent Application Laid-Open Publication No. 2005-123843, an communication device is connected to a PC through a USB cable, and image data, etc., in the communication device are transferred to the PC through the USB cable and stored (abstract, FIGS. 1 and 2).

By the way, if data are transferred from a PC to a portable terminal device disposed with an external storage device to write the data into the external storage device, the portable terminal device and the PC are connected with a USB cable, and the portable terminal device uses DBB-LSI (Digital Base Band—Large Scale Integration) constituting a modem to perform data transfer and data writing via so-called PC communication through the intervention of the modem.

When an electronic device is disposed with a single USB driver as is the case of the portable terminal device, a single interface (I/F) is connected to a USB cable and the data transfer tends to be complicated. If serial/parallel signals are used for an internal process of the portable terminal device in the data transfer, the rate of the data transfer is reduced due to the data length limitation and clock performance, and the writing time of the external storage device is limited.

Various types of data such as documents, images, videos, music, and game software are transferred from the PC to the external storage device of the portable terminal device, and it is indicated that transferring of an enormous amount of data such as video data or music data takes time.

Japanese Patent Application Laid-Open Publication Nos. 2005-130339 and 2005-123843 do not disclose or indicate such problems or a means for solving the problems.

SUMMARY OF THE INVENTION

An object of the present invention relates to data transfer to an external storage device disposed or connected with an electronic device and is to accelerate the data transfer.

Describing the object specifically, a data transmission path is simplified between an external device that supplies data and an external storage device that is a data transfer destination to accelerate the data transfer and to contribute to the reduction of the data writing time in the external storage device.

To achieve the object, the present invention relates to a device or circuit device connected or disposed with an external storage device, includes a transmission channel connected to an external device, i.e., data supply source, to transmit data, and simplifies a data transmission path intervening between this transmission channel and the external storage device to accelerate the data transfer and to accelerate the data writing to the external storage device.

To achieve the above object, according to a first aspect of the present invention there is provided an electronic device connected or disposed with an external storage device, the electronic device comprising a transmission channel that is connected to an external device to transmit data; and a data transferring unit that is connected to the transmission channel, the data transferring unit including a switching function allowing or blocking passage of data, in case of writing data into the external storage device, the data transferring unit allowing passage of the data received from the transmission channel to transfer the data to the external storage device.

According to such a configuration, since the data transmission path is simplified in the electronic device intervening between the external storage device and the external device, the data transfer can be accelerated.

To achieve the above object, the electronic device may comprise a data processing unit that is connected to the transmission channel, the data processing unit including a switching function receiving or blocking data, the data processing unit superimposing the data received from the external device through the transmission channel on a carrier signal.

To achieve the above object, the electronic device may comprise a detecting unit that detects whether the external device is connected to the transmission channel, wherein the data transferring unit is controlled based on the detection result of the detecting unit.

To achieve the above object, in the electronic device, the transmission channel may be USB.

To achieve the above object, according to a second aspect of the present invention there is provided a data transfer controlling program of an electronic device connected or disposed with an external storage device, the electronic device including a computer, the data transfer controlling program being executed by the computer, the program comprising the steps of allowing or blocking passage of data sent from an external device; and transferring the data received from the external device to the external storage device. According to such a configuration, the object is achieved by a computer process.

To achieve the above object, the data transfer controlling program of an electronic device may comprise the steps of detecting whether the external device is connected to a transmission channel; generating an inquiry representing whether the data are input to a data processing unit or input to a data transferring unit, based on detecting whether the external device is connected to the transmission channel; and generating display of the inquiry.

To achieve the above object, according to a third aspect of the present invention there is provided a circuit chip of an electronic device connected or disposed with an external storage device, the chip comprising a data transferring unit that is connected to a transmission channel, the data transferring unit including a switching function allowing or blocking passage of data, in case of writing data into the external storage device, the data transferring unit allowing passage of the data from the transmission channel to transfer the data to the external storage device.

To achieve the above object, the circuit chip may comprise a data processing unit that is connected to the transmission channel, the data processing unit including a switching function receiving or blocking data, the data processing unit superimposing the data received from an external device through the transmission channel on a carrier signal.

To achieve the above object, according to a forth aspect of the present invention there is provided an electronic device connected or disposed with an external storage device, the electronic device comprising a transmission channel that is connected to an external device to transmit data; a data processing unit that is connected to the transmission channel to receive or block data; and a data transferring unit that allows passage of data from the external device through the transmission channel to transfer the data to the external storage device in case where the data processing unit blocks the data.

According to such a configuration, since the data from the external device are received by selectively switching the data processing unit and the data transferring unit as needed and the data transfer can be performed by the transmission channel and the data transferring unit when transferring data from the data transferring unit to the external storage device, the data transfer path can be simplified to accelerate the data transfer.

To achieve the above object, the electronic device may comprise a detecting unit that detects whether the external device is connected to the transmission channel; an inquiry generating unit that generates an inquiry representing whether the data are received by the data processing unit or received by the data transferring unit, in response to the detection result of the detecting unit; and a displaying unit that displays the inquiry generated by the inquiry generating unit.

To achieve the above object, in the electronic device, the transmission channel may be USB.

To achieve the above object, according to a fifth aspect of the present invention there is provided a data transfer controlling method of an electronic device connected or disposed with an external storage device, the method comprising the steps of: allowing or blocking passage of data sent from an external device; and transferring the data received from the external device to the external storage device.

To achieve the above object, the data transfer controlling method of an electronic device may comprise the steps of detecting whether the external device is connected to a transmission channel; generating an inquiry representing whether the data are received by a data processing unit or received by a data transferring unit, based on detecting whether the external device is connected to the transmission channel; and generating display of the inquiry.

To achieve the above object, according to a sixth aspect of the present invention there is provided a circuit chip of an electronic device connected or disposed with an external storage device, the chip comprising a data processing unit that is connected to a transmission channel to receive or block data; and a data transferring unit that allows passage of data from the external device through the transmission channel to transfer the data to the external storage device in case where the data processing unit blocks the data.

To achieve the above object, according to a seventh aspect of the present invention there is provided a circuit device connected or disposed with an external storage device, the circuit device comprising a data transferring unit that is connected to a transmission channel, the data transferring unit including a switching function allowing or blocking passage of data, in case of writing data into the external storage device, the data transferring unit allowing passage of the data from the transmission channel to transfer the data to the external storage device.

To achieve the above object, the circuit device may comprise a data processing unit that is connected to the transmission channel, the data processing unit including a switching function receiving or blocking data, the data processing unit superimposing the data received from the external device through the transmission channel on a carrier signal.

To achieve the above object, according to an eighth aspect of the present invention there is provided a circuit device connected or disposed with an external storage device, the circuit device comprising a transmission channel that is connected to an external device to transmit data; a data processing unit that is connected to the transmission channel to receive or block data; and a data transferring unit that allows passage of data from the external device through the transmission channel to transfer the data to the external storage device in case where the data processing unit blocks the data.

To achieve the above object, the circuit device may comprise a detecting unit that detects whether the external device is connected to the transmission channel; an inquiry generating unit that generates an inquiry representing whether the data are received by the data processing unit or received by the data transferring unit, in response to the detection result of the detecting unit; and a displaying unit that displays the inquiry generated by the inquiry generating unit.

To achieve the above object, in the circuit device, the transmission channel may comprise a first bus connected between the data processing unit and the data transferring unit and a second bus that connects the first bus and the device.

To achieve the above object, according to a ninth aspect of the present invention there is provided a data transfer system comprising an electronic device connected or disposed with an external storage device, the system comprising an external device that supplies data to the electronic device; a transmission channel that is connected to the external device to transmit data; a data processing unit that is connected to the transmission channel to receive or block data; and a data transferring unit that allows passage of data from the external device through the transmission channel to transfer the data to the external storage device in case where the data processing unit blocks the data.

According to such a configuration, since the data transfer path is simplified in the electronic device intervening between the external device and the external storage device and the data transfer path is simplified between the external device and the data processing unit, the data transfer is accelerated. Since the data processing unit and the data transferring unit are selectively switched to receive the data with these data transfer paths, a malfunction is prevented in the data processing unit or the data transferring unit on the path not receiving the data and the reliability of the data transfer is improved.

To achieve the above object, in the data transfer system, the transmission channel may comprise a first bus connected between the data processing unit and the data transferring unit and a second bus that connects the first bus and the device.

To achieve the above object, according to a tenth aspect of the present invention there is provided an electronic device connected or disposed with an external storage device, the electronic device including a communication function, the electronic device comprising: a transmission channel that is connected to an external device to transmit data sent from the external device; a data processing unit that is connected to the transmission channel to accept the data in case where a communication mode is executed; and a data transferring unit that accepts the data to transfer to the external storage device in case where a data writing mode of the external storage device is executed.

The features and advantages of the present invention are listed as follows.

(1) Data transfer can be accelerated when data are supplied from an external device to an external storage device disposed on or connected to an electronic device.

(2) A data transmission path is simplified between an external device that supplies data and an external storage device that is a data transfer destination to accelerate the data transfer and to contribute to the reduction of the data writing time in the external storage device.

BRIEF DESCRIPTION OF THE DRAWINGS

Other objects, features, and advantages of the present invention will be more apparent by reference to the accompanying drawings and each embodiment.

DETAILED DESCRIPTION OF THE PREFERRED EMBODIMENTS

[First Embodiment]

Figure 1:
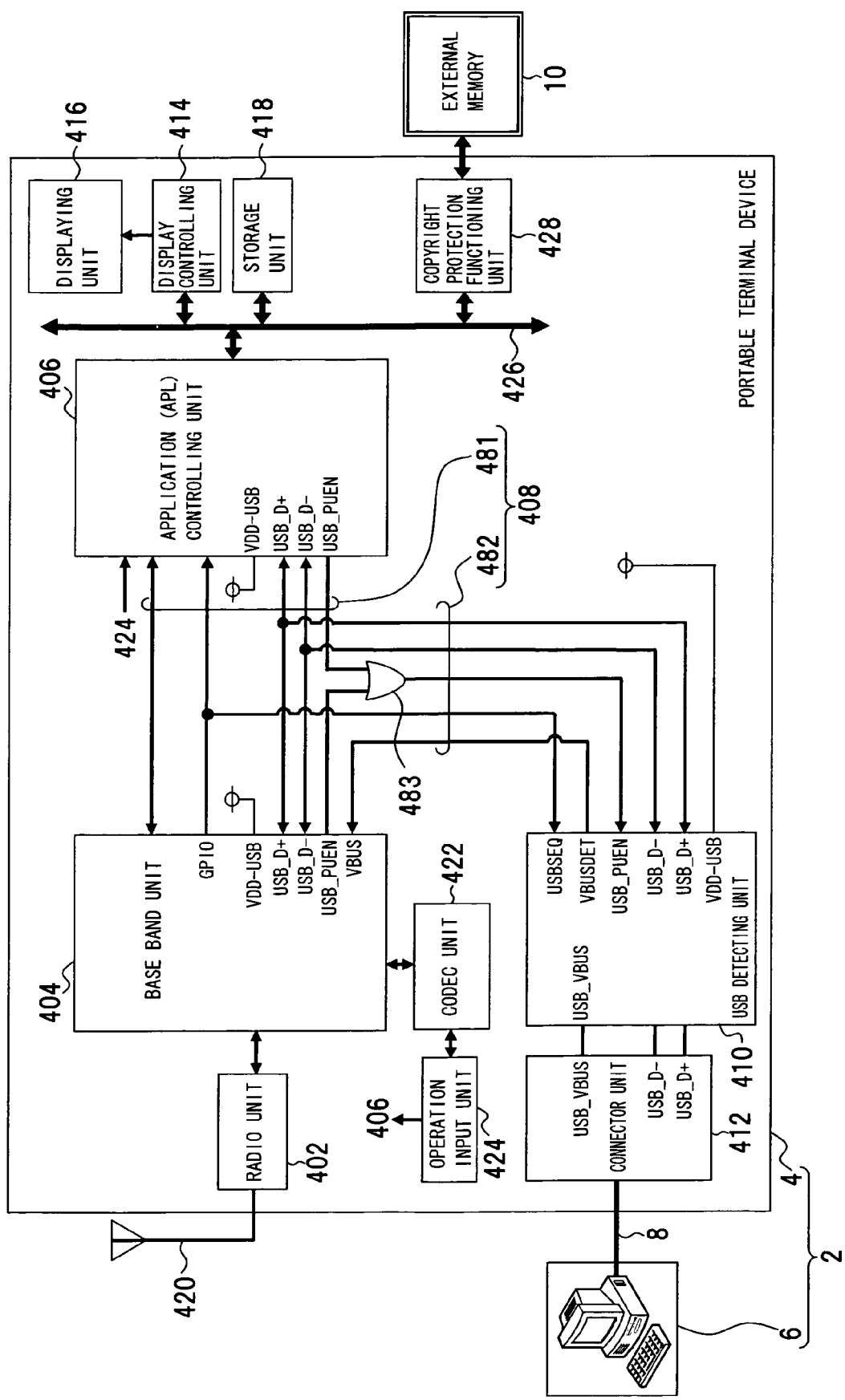
FIG. 1 shows a data transfer system according to a first embodiment.
Figure 2:
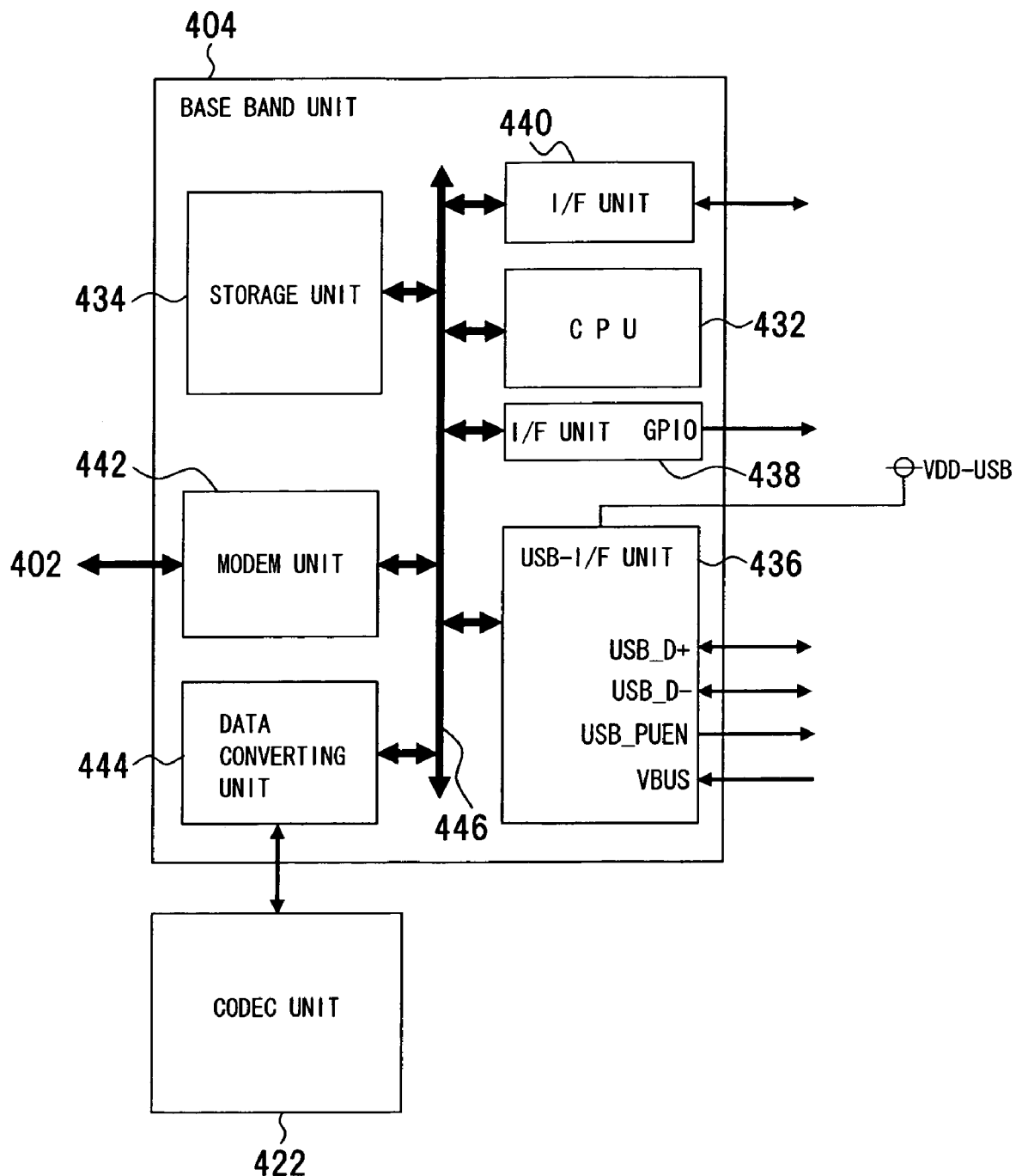
FIG. 2 shows a configuration example of a base band unit.
Figure 3:
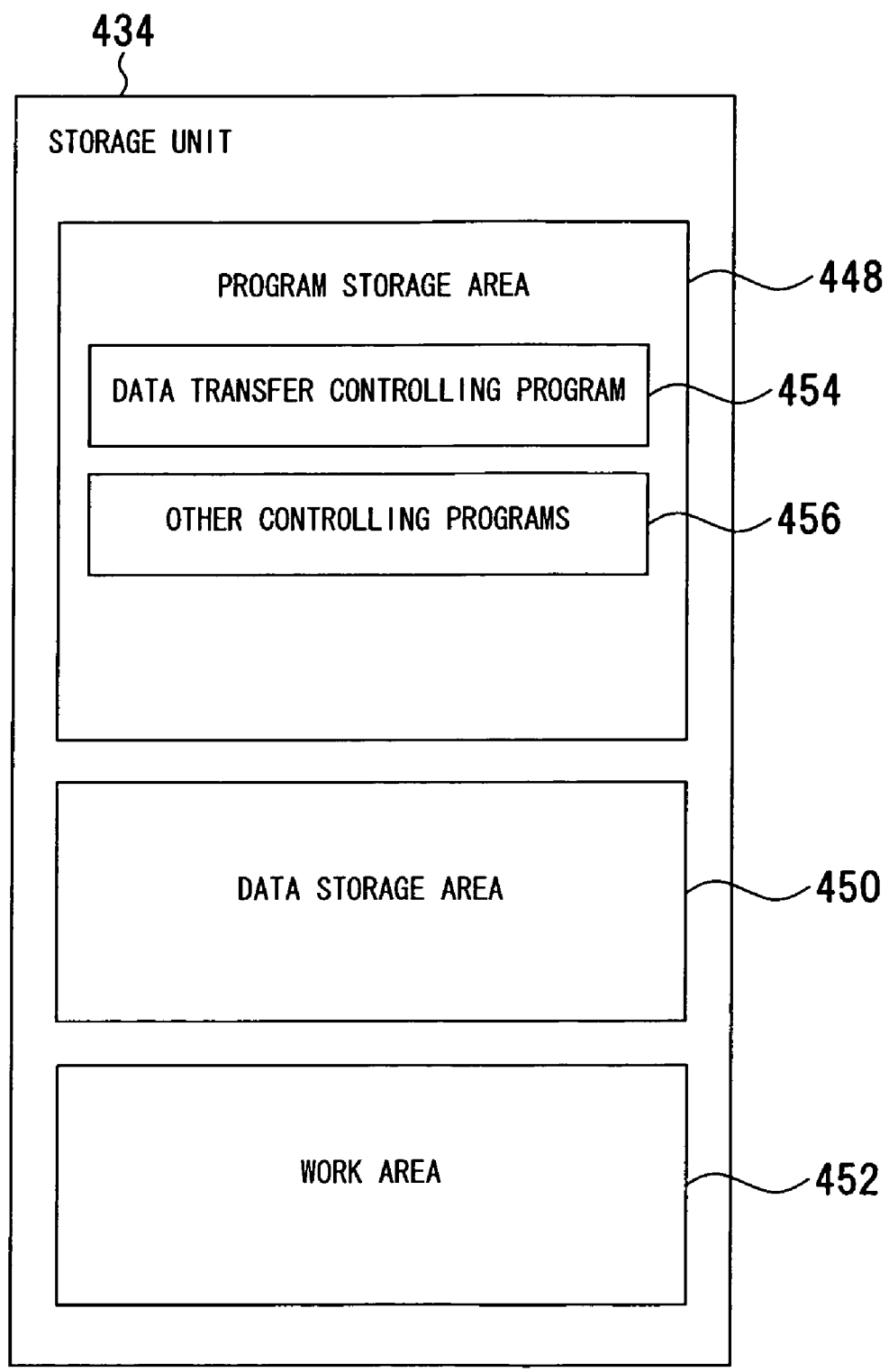
FIG. 3 shows a configuration example of a storage unit of the base band unit.
Figure 4:
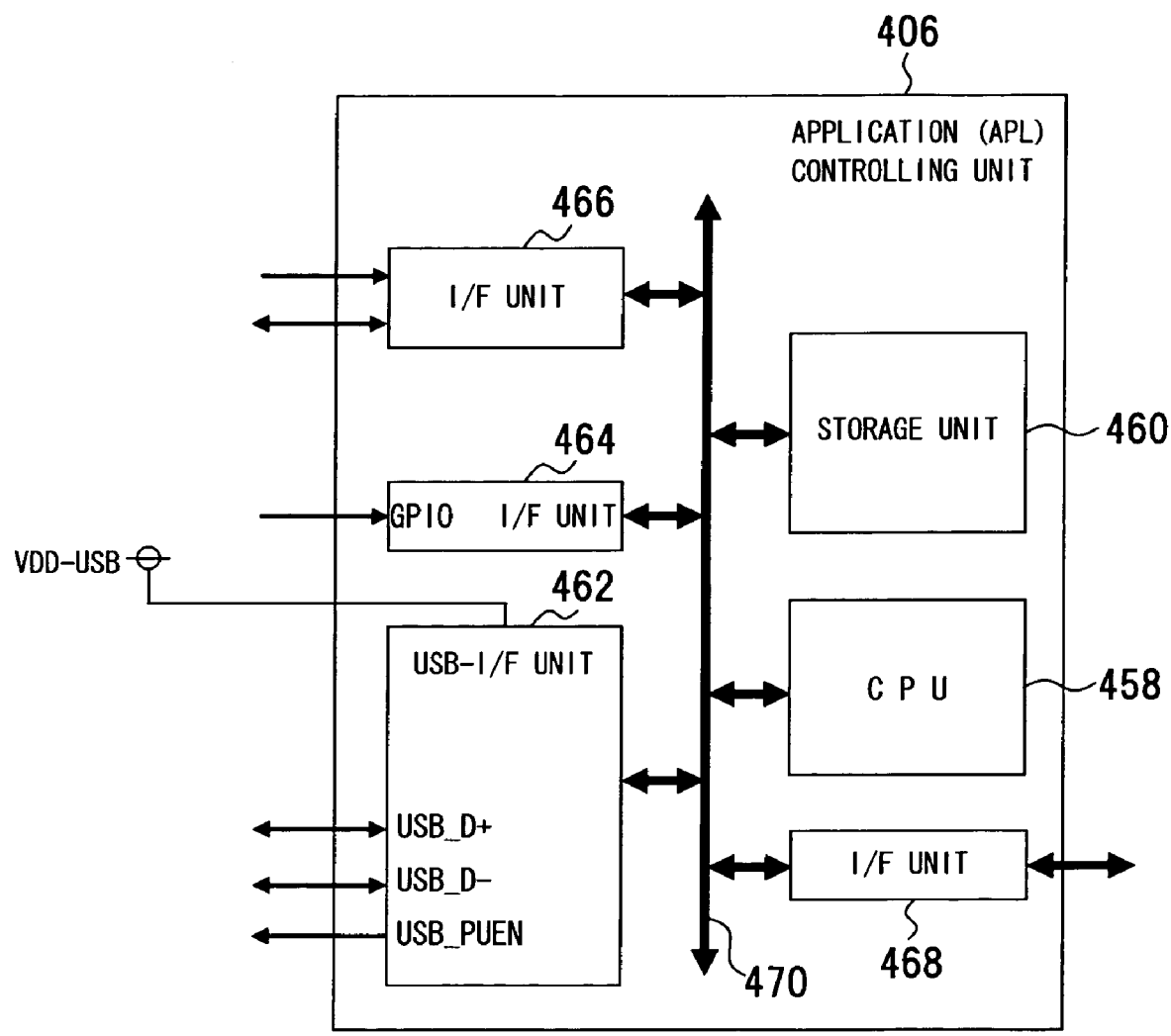
FIG. 4 shows a configuration example of an APL controlling unit.
Figure 5:
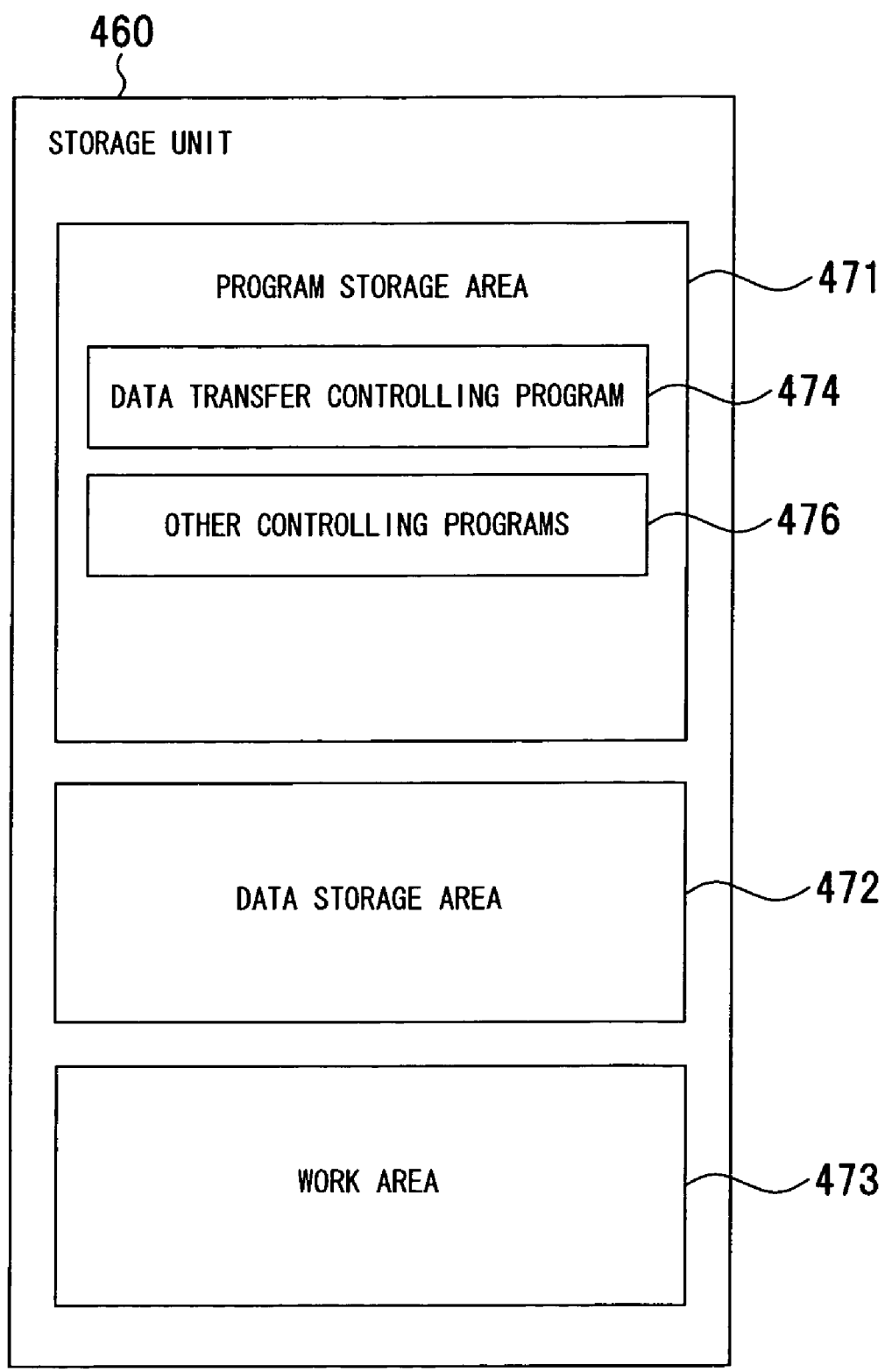
FIG. 5 shows a configuration example of a storage unit of the APL controlling unit.
Figure 6:
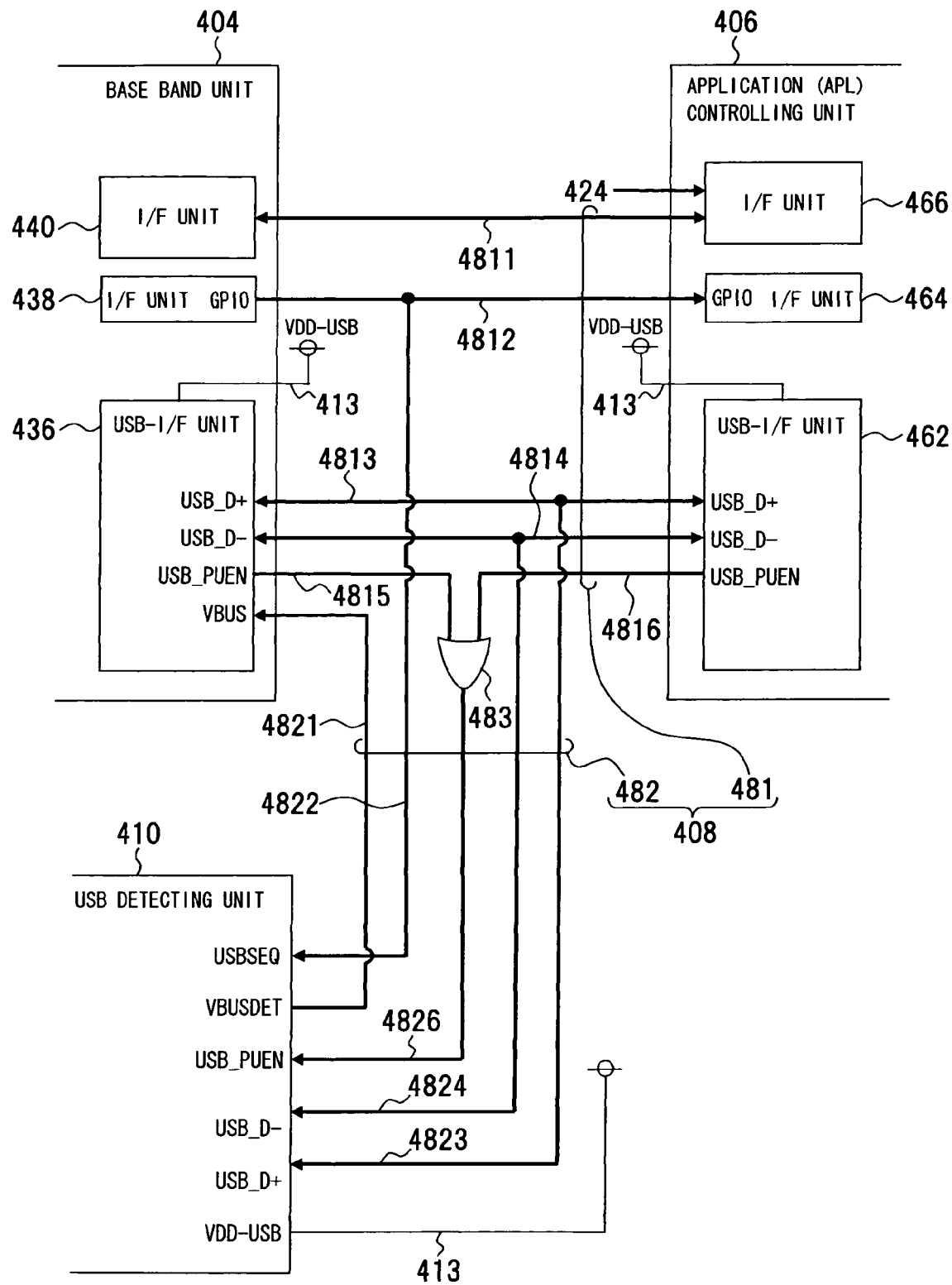
FIG. 6 shows a configuration example of a transfer channel.
Figure 7:
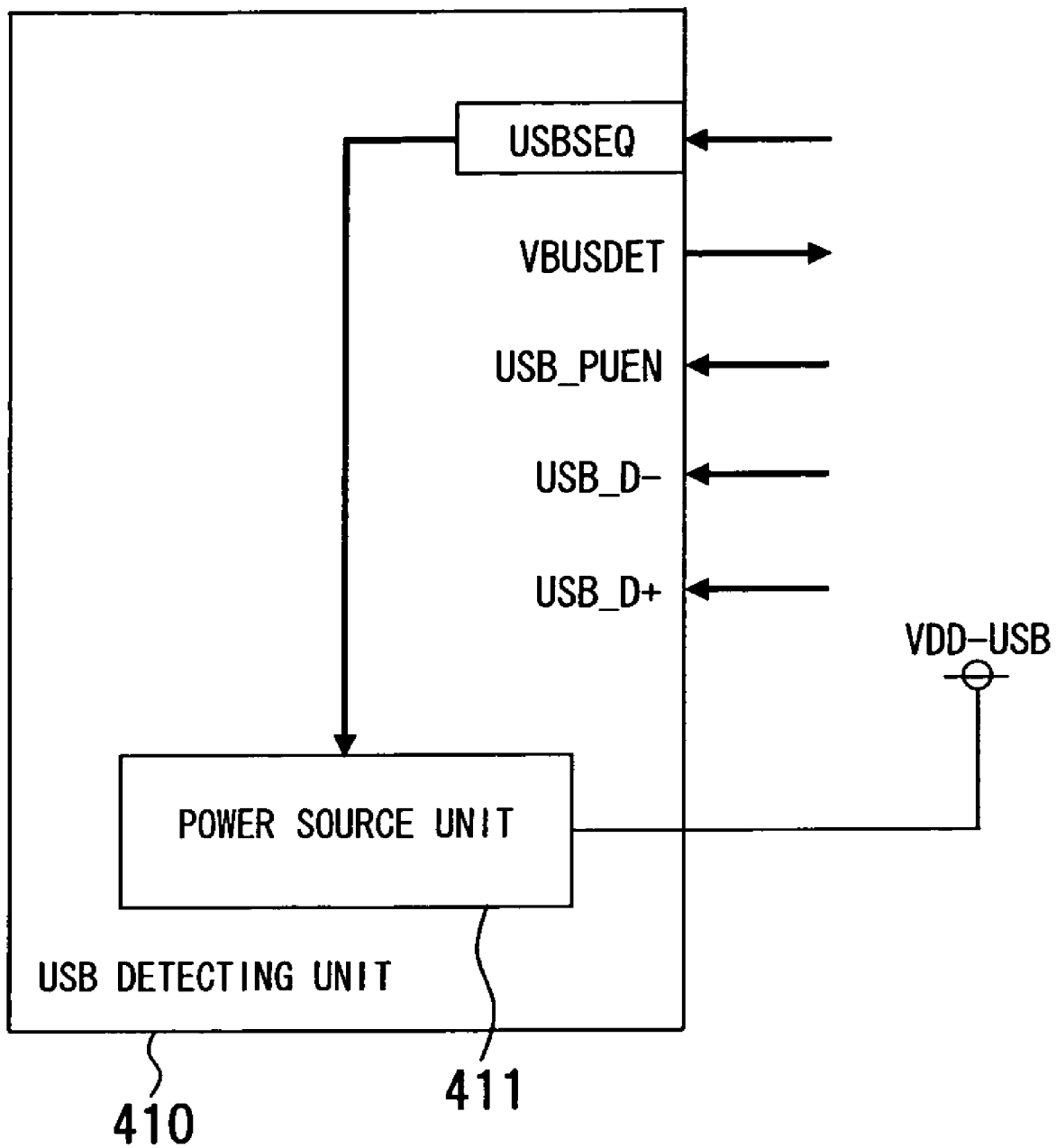
FIG. 7 shows a configuration example of a USB detecting unit.
Figure 8:
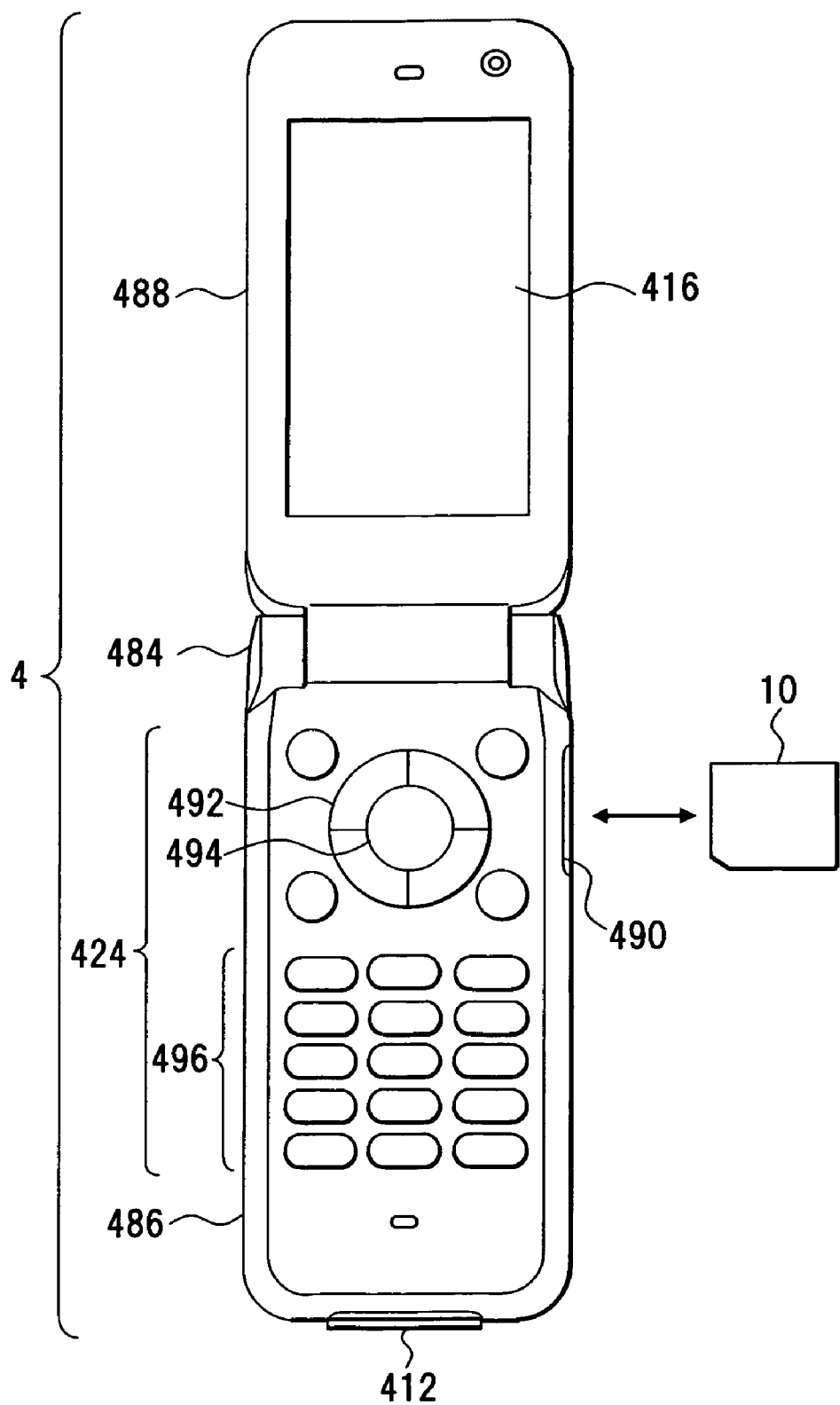
FIG. 8 shows a configuration example of a portable terminal device.
Figure 9:
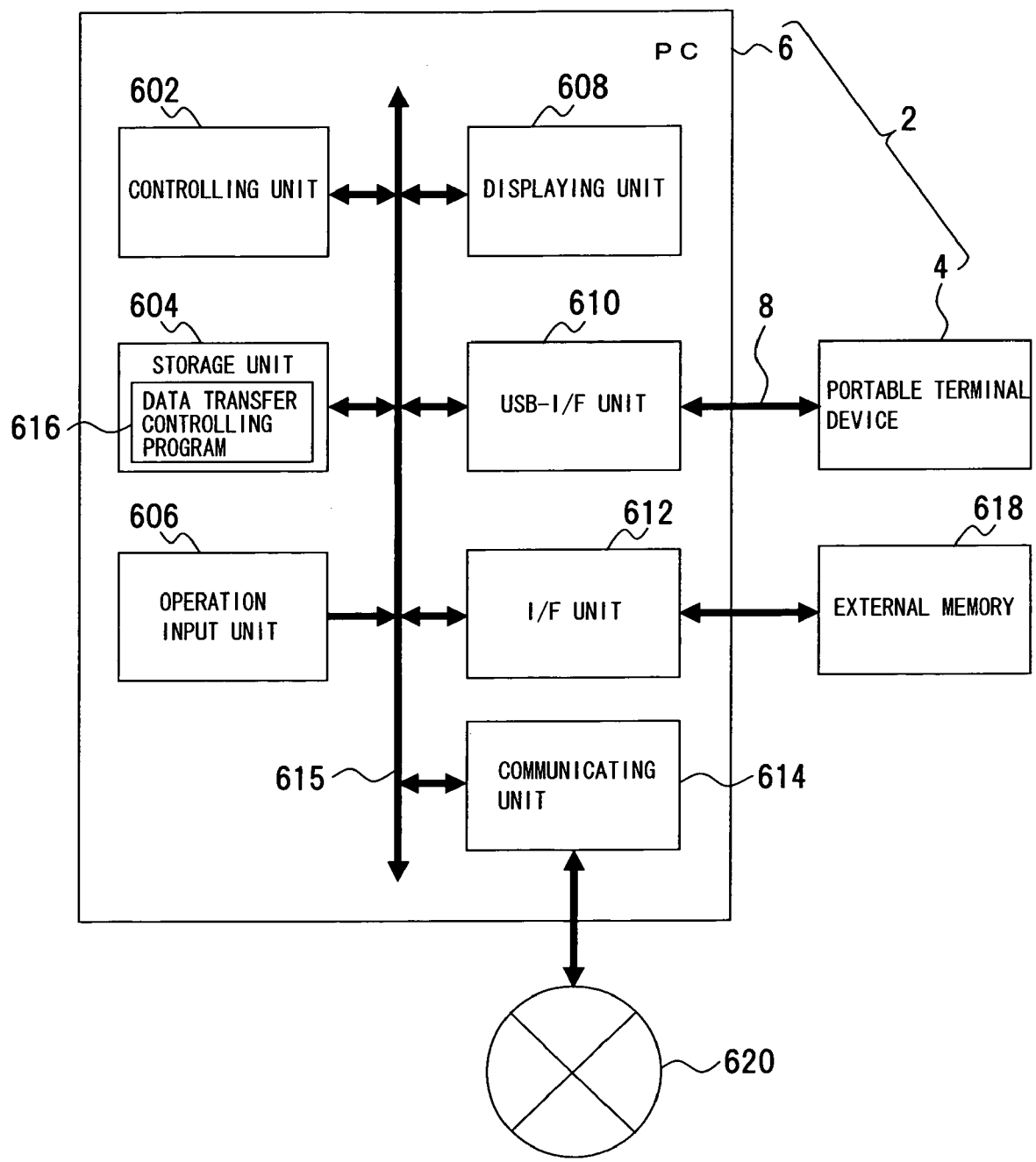
FIG. 9 shows a configuration example of a PC.

A first embodiment of the present invention will be described with reference to FIGS. 1 to 9. FIG. 1 shows a data transfer system using a portable terminal device; FIG. 2 shows a configuration example of a base band unit; FIG. 3 shows a configuration example of a storage unit of the base band unit; FIG. 4 shows a configuration example of an application controlling unit; FIG. 5 shows a configuration example of a storage unit of the application controlling unit; FIG. 6 shows an enlarged transfer channel; FIG. 7 shows a configuration example of a USB detecting unit; FIG. 8 shows a configuration example of the portable terminal device; and FIG. 9 shows a configuration example of a personal computer (PC). FIGS. 1 to 9 are an example of the present invention and the present invention is not limited to such configurations.

This data transfer system 2 connects a portable terminal device 4 and an external device, i.e., a personal computer (PC) 6, with a USB (Universal Serial Bus) cable 8 and has a communication function (communication mode) that uses a communication function included in the portable terminal device 4 to transfer data from the PC 6 to a communication destination and a relay function (storage mode) that transfers and writes data from the PC 6 into an external storage device (hereinafter, "external memory") 10 in the portable terminal device 4. The USB cable 8 is a cable that includes a pair of transmission lines and a pair of power supply transmission lines as is well known. The data written into the external memory 10 are various types of data such as music and video. The data transfer system 2 can be applied to the case of transferring data in the external memory 10 to the PC 6; the storage mode is not limited to the writing into the external memory 10; and the data transfer system 2 can be used when the data is transferred to the PC 6 also in the communication mode. Although the external device is illustrated as the PC 6 that is a USB device, the PC 6 is not limited to a USB device as long as the PC 6 acts as a data source.

The portable terminal device 4 is an example of an electronic device such as a cellular phone and includes a communication function such as a wireless telephone or fixed-line telephone function as well as a relay function for the data transfer from the external device such as the PC 6, a data writing function to the external memory 10, and a data processing function using the data in the external memory 10. The PC 6 is an example of the external device that can be connected to the portable terminal device 4 through an external transmission channel, for example, the USB cable 8, to give and receive data. The USB cable 8 is an example of the data transmission channel and other transmission cables or interfaces may be used as long as consistency is established between the portable terminal device 4 and the external device to enable efficient data transmission. The external memory 10 includes a nonvolatile memory, for example, the SD (Secure Digital) memory card, and any storage medium may be used as long as various data such as video and music can be stored.

In the communication mode included in the portable terminal device 4, data are given and received by using the portable terminal device 4 as a communication medium for communication between the PC 6 and another PC or portable terminal device. The storage mode is an operation form such as writing data provided from the PC 6 into the external memory 10 disposed on the portable terminal device 4 and may include operation of loading data from the external memory 10 to the PC 6. Switch-over of these operation forms may be arbitrarily selected by a user from a menu screen of the portable terminal device 4 or the communication mode may be set by default when the portable terminal device 4 is powered on (power supply is started). Although the communication mode is selected by default at the time of power-on in this embodiment, an inquiry message is issued through a display screen to a user based on the detection that the PC 6 is connected to the portable terminal device 4 to inquire whether the storage mode is selected, and the user selects a desired mode.

As shown in FIG. 1, the portable terminal device 4 includes a radio unit 402, a base band unit 404, an application (APL) controlling unit 406, a transmitting channel 408, a USB detecting unit 410, a connector unit 412, a display controlling unit 414, a displaying unit 416, and a storage unit 418.

The radio unit 402 includes an antenna 420, controls radio communication with a base station, and transmits to the base station a transmission signal created by superimposing data such as packet data or voice on a carrier signal or acquires data such as packet data or voice from a radio signal received from the base station, under the control of a CPU (Central Processing Unit) 432 (FIG. 2) in the base band unit 404. If the base band unit 404 is set to the communication mode, the radio unit 402 converts the data from the base band unit 404 into a radio signal and transmits the signal to a communication destination.

The base band unit 404 is an example of a data processing unit connected to the transmission channel 408 to determine whether data are delivered to the radio unit 402, includes an interface function for the transmission channel 408, and controls communication such as a process of a base band signal relating to data and voice. For example, as shown in FIG. 2, the base band unit 404 is constituted by a base band control LSI (Large Scale Integration), which is a circuit chip, and includes the CPU 432, a storage unit 434, a USB interface unit (USB-I/F unit) 436, other interface units (I/F units) 438, 440, a modem unit 442, and a data converting unit 444, which are connected with a bus 446.

In the base band unit 404 with such a configuration, under the controls of the CPU 432, the USB-I/F unit 436 receives detection output indicating that the USB device is connected; a response is sent from the I/F unit 438 to the USB detecting unit 410 to indicate that the detection output is received; and the APL controlling unit 406 is also notified that the detection output is received. For example, if the communication mode is set by default, the USB-I/F unit 436 notifies the USB detecting unit 410 of an output USB_PUEN representing permission to accept data, and if the acceptance of data is permitted, data input ports USB_D+, USB_D− are set to the pull-up state to accept the data. The I/F unit 440 is used for communication with the APL control unit 406 and to give and receive various control data. The storage unit 434 includes a nonvolatile memory; for example, a program storage area 448, a data storage area 450, a work area 452, etc., are established therein as shown in FIG. 3; and the program storage area 448 stores a data transfer controlling program 454 and other controlling programs 456.

As shown in FIG. 1, the base band unit 404 is connected with a codec unit 422 used in a process such as coding (analog/digital conversion) of a voice signal, and the codec unit 422 is connected with an operation input unit 424. The operation input unit 424 is also connected with the APL controlling unit 406 and includes, for example, a keyboard that is used to input symbols, etc., and to respond to inquiry messages and dialog boxes deployed on the display screen of the displaying unit 416.

The APL control unit 406 is an example of a data transferring unit connected to the transmission channel 408, including a switching function allowing or blocking passage of data, and allowing passage of the data received from the transmission channel 408 to transfer the data to the external memory 10, and the APL control unit 406 is connected to the external memory 10 through a bus 426 and a copyright protection functioning unit 428. If the storage mode is selected, data are accepted from the PC 6 through the transmission channel 408, pass through the APL controlling unit 406, and are written into the external memory 10. In this case, the base band unit 404 is detached from the data transmission path in the storage mode and the data transmission is accelerated as compared to the case that the base band unit 404 exists in the path.

For example, as shown in FIG. 4, the APL controlling unit 406 is constituted by an APL control LSI, which is a circuit chip, and includes the CPU 458, a storage unit 460, a USB interface unit (USB-I/F unit) 462, other interface units (I/F units) 464, 466, 468, which are connected with a bus 470.

In the APL controlling unit 406, under the controls of the CPU 458, the I/F unit 466 captures a control output issued from the base band unit 404. By receiving this control output, an inquiry message output is issued to the display controlling unit 414 to inquire whether the default communication mode is switched to the storage mode. That is, an inquiry generating unit includes the CPU 458, the storage filter 460, etc., and the output thereof is deployed as an image on the displaying unit 416 through the display controlling unit 414. If the storage mode is selected, the USB-I/F unit 462 notifies the USB detecting unit 410 of the output USB_PUEN representing permission to accept data (i.e., permission of passage of data), and if the acceptance of data is permitted, the data input ports USB_D+, USB_D− are set to the pull-up state to accept the data. The I/F unit 466 is used to give and receive data in various controls to the base band 404. The storage unit 460 includes a nonvolatile memory; for example, a program storage area 471, a data storage area 472, a work area 473, etc., are established therein as shown in FIG. 5; and the program storage area 471 stores a data transfer controlling program 474 and other controlling programs 476. The data transfer controlling program 474 corresponds to the aforementioned data transfer controlling program 454 and the both programs are used for executing the data transfer control in a coordinated manner.

The transmission channel 408 includes a first bus 481 disposed between the base band unit 404 and the APL controlling unit 406 and a second bus 482 linking this bus 481 and the USB detecting unit 410. As shown in FIG. 6, the bus 481 includes a transmission line 4811 of a plurality of bits used for giving and receiving data between the base band unit 404 and the APL controlling unit 406, a transmission line 4812 that transmits the control output from the base band unit 404 to the APL controlling unit 406, USB transmission lines 4813, 4814 giving and receiving data between the base band unit 404 and the APL controlling unit 406, a transmission line 4815 for transmitting the control output of the base band unit 404 to the USB detecting unit 410, and a transmission line 4816 for transmitting the response output of the APL controlling unit 406 to the USB detecting unit 410.

The bus 482 includes a transmission line 4821 for transmitting the detection output of the USB detecting unit 410 to the base band unit 404, a transmission line 4822 branched from the transmission line 4812 to transmit the control output of the base band 404 to the USB detecting unit 410, USB transmission lines 4823, 4824 branched from the USB transmission lines 4813, 4814 and connected to the USB detecting unit 410, and a transmission line 4826 for transmitting the control output (response output) from the transmission lines 4815, 4816 to the USB detecting unit 410 through an OR circuit 483.

The USB detecting unit 410 detects that the USB device, i.e., the PC 6, etc., is connected to the connector unit 412 connected to the USB detecting unit 410 via the transmission channel 408 as shown in FIG. 1 and notifies the base band unit 404 of the detection output through the aforementioned transmission line 4821. The connector unit 412 is disposed on the portable terminal device 4 and has a data input/output port corresponding to the transmission line of the USB cable 8 and a power supply port corresponding to a power line.

The USB detecting unit 410 detects whether the PC 6 is connected to the connector unit 412 from a voltage applied through the USB cable 8 and the connector unit 482 from the PC 6. A detection output VBUSDET output by the USB detecting unit 410 is applied to the USB-I/F unit 436 of the base band unit 404, and the response output is applied from the I/F unit 438 to the USB detecting unit 410 through the transmission line 4822 and is also applied to the I/F unit 464 of the APL controlling unit 406 through the transmission line 4812. At the same time, the APL controlling unit 406 is interrupted and notified that the PC6 is connected to the connector unit 412, and the APL controlling unit 406 correspondingly enables the execution of the storage mode.

As shown in FIG. 7, the USB detecting unit 410 houses a power source unit 411 and, for example, the power source unit 411 includes a switching regulator, constitutes a power source necessary for the operation of the USB-I/F unit 436 of the base band unit 404 and the USB-I/F unit 462 of the APL controlling unit 406, and receives a response output USBSEQ of the I/F unit 438 for the voltage detection output VBUSDET of the USB detecting unit 410 to generate a constant voltage output VDD-USB. The voltage output VDD-USB is supplied to the USB-I/F unit 436 of the base band unit 404 and the USB-I/F unit 462 of the APL controlling unit 406 through a power line 413.

As shown in FIG. 1, the display controlling unit 414 controls the display of the displaying unit 416 including the LCD (liquid Crystal Display), etc., and displays a dialog message, etc., output from the APL controlling unit 406 as an image on the displaying unit 416. The display controlling unit 414 is also used for image control, such as capturing of camera images, other than the display on the displaying unit 416. The storage unit 418 includes a nonvolatile memory, etc., and stores images, ring tones, etc.

For example, as shown in FIG. 8, the portable terminal device 4 includes cases 486, 488 that can be folded with a hinge unit 484. The case 486 includes the operation input unit 424, a mounting unit 490 of the external memory 10, and the connector unit 412, and operation input unit 424 includes cursor keys 492, a decision key 494, a plurality of symbol input keys 496, etc. The case 488 is disposed with the displaying unit 416, etc.

For example, as shown in FIG. 9, the PC 6 connected to the portable terminal device 4 includes a controlling unit 602, a storage unit 604, an operation input unit 606, a displaying unit 608, a USB interface unit (USB-I/F unit) 610, an interface unit (I/F unit) 612, and a communicating unit 614, which are connected with a bus 615. The controlling unit 602 includes a CPU executing programs in the storage unit 604, a RAM, etc. A program storage area and a data storage area are established in the storage unit 604; the program storage area stores a data transfer controlling program 616; and a data storage area stores data such as music, images, etc. The operation input unit 606 includes a keyboard, etc., and the displaying unit 608 includes an LCD, etc. The USB-I/F unit 610 is connected with the aforementioned portable terminal device 4 via the USB cable 8. The I/F unit 612 loads music data, etc., from an external memory 618 such as a CD. The communicating unit 614 is connected to the Internet 620 and used for loading music data through the Internet 620. Such data are transferred from the PC 6 to the portable terminal device 4 as needed.

Description will be made of processes of the data transfer controlling method and the data transfer controlling program.

(1) Data Transfer Control (USB Mode)

Figure 10:
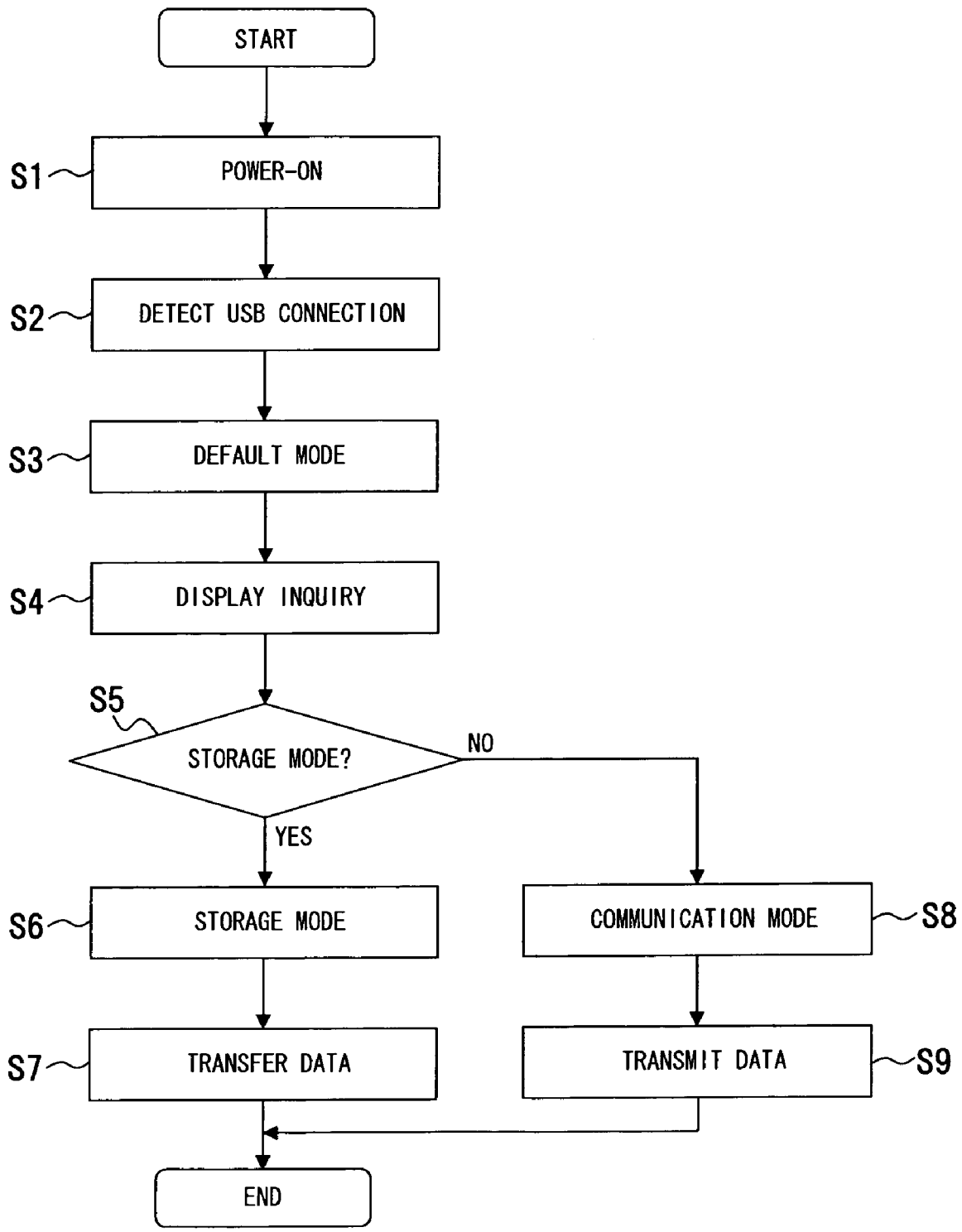
FIG. 10 is a flowchart of a process procedure of data transfer control.

FIG. 10 is a flowchart of a process procedure of a data transfer process. This data transfer process is achieved by executing the data transfer controlling programs 454 (FIG. 3), 474 (FIG. 5) and initial operation is executed by the power-on of the portable terminal device 4 (step S1). When the connector unit 412 is connected with the USB device, for example, the PC 6, the connection of the PC 6 is detected from the detection of the voltage applied from the PC 6 to the USB detecting unit 410 (step S2). That is, the USB mode is executed and the default mode is activated (step S3). In this embodiment, the communication mode is set as an initial value by default.

In this default mode, when the base band unit 404 notifies the APL controlling unit 406 of the connection of the PC 6, the inquiry output is issued and the inquiry message is displayed on the displaying unit 416 (step S4). That is, a user is asked to determine whether the storage mode is selected (step 5S), and if the storage mode is selected, the storage mode is executed (step S6) and the APL controlling unit 406 accepts the data from the PC 6 through the USB cable 8, the transmission channel 408, etc., to transfer the data to the external memory 10 (step S7).

If the communication mode is selected at step S5, the communication mode is executed (step S8) and the base band unit 404 accepts the data from the PC 6 through the USB cable 8, the transmission channel 408, etc., to transmit the data to the communication destination through the radio unit 402 (step S9).

In this data transfer control, the process of the APL controlling unit 406 includes a step of allowing or blocking passage of the data sent from PC 6, which is the external device, and a step of transferring the data received from the PC 6 to the external memory 10.

In this data transfer control, the process of the base band unit 404 includes a step of switching the acceptance or blocking of the data sent from PC 6, which is the external device, and a step of superimposing the data received from the PC 6 on a carrier signal to transmit the data.

This data transfer controlling process includes a USB detecting process that is a step of detecting whether the PC 6 is connected to the connector unit 412 and the transmission channel 408, and an inquiring process that is a step of generating an inquiry about whether the data are input to the base band unit 404, i.e., the data processing unit, or to the APL controlling unit 406, i.e., the data transferring unit, based on detecting whether the PC 6 is connected to the connector unit 412 and the transmission channel 408, and a step of generating the display of the inquiry.

(2) Storage Mode Switching Sequence, Data Transfer, and Writing Process

Figure 11:
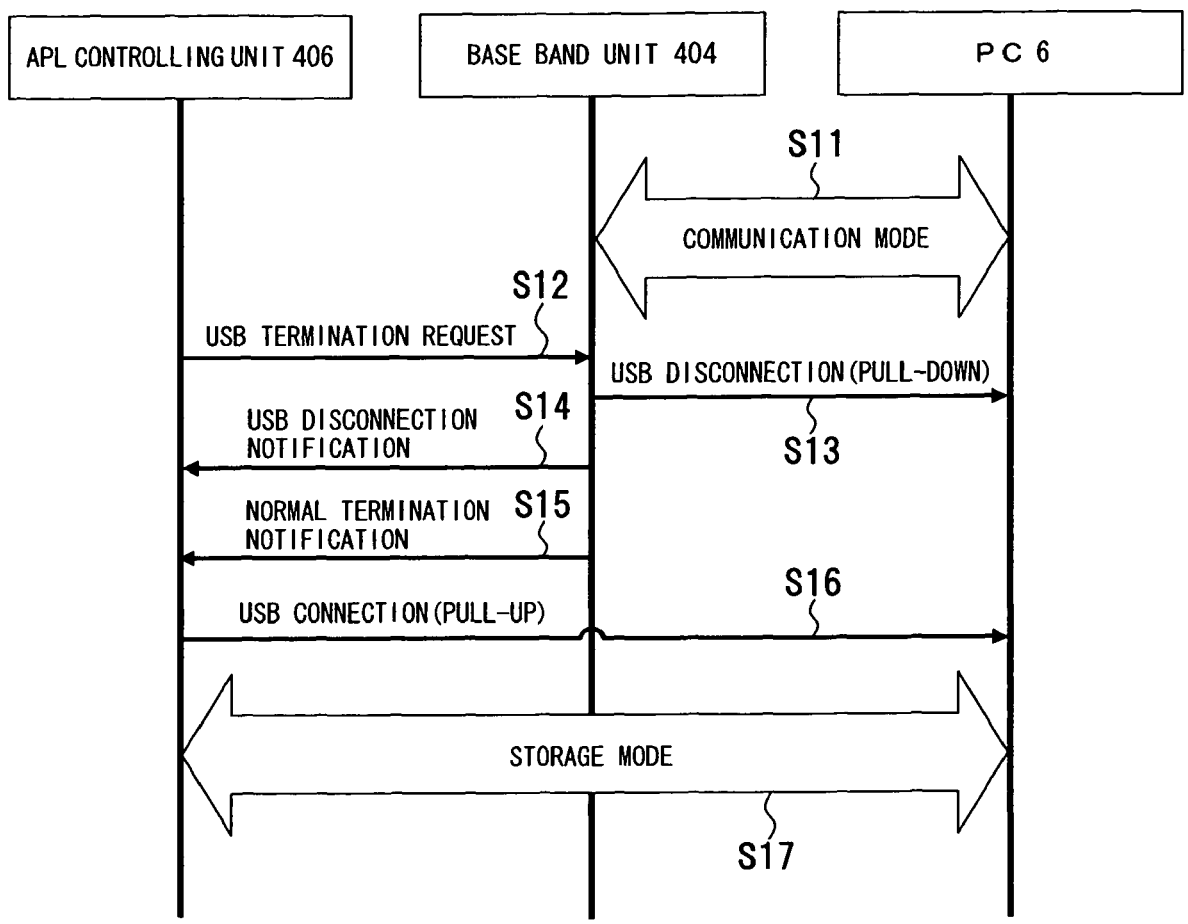
FIG. 11 shows a storage mode switching sequence.

FIG. 11 shows a storage mode switching sequence.

When the portable terminal device 4 is initially turned on, the communication mode is set by default. In the communication mode, as described above, the data are accepted by the base band unit 404 and the data are transmitted as radio signals through the radio unit 402.

As shown in FIG. 11, the communication mode is set between the base band unit 404 and the PC 6 to enable the data transfer between the base band unit 404 and the PC 6 (step S11), and the storage mode is selected from a menu mode of the portable terminal device 4 to switch this state to the storage mode. When the storage mode is selected, the APL controlling unit 406 issues a USB termination request to the base band unit 404 (step S12) and the base band unit 404 receives this request and performs USB disconnection (pull-down) for the PC 6 (step S13). In this case, the data input ports USB_D−, USB_D+ of the USB-I/F unit 436 of the base band unit 404 are switched to the pull-down state, i.e., high impedance, and a blocking state is established as the operation of refusing the input of data. When the USB disconnection process is executed, the base band 404 issues a USB disconnection notification to the APL controlling unit 406 to indicate that the USB disconnection is executed (step S14) When this USB disconnection notification is issued, the control output USB_PUEN representing the state of the USB-I/F unit 436 of the base band unit 404 is switched from a level H to a level L, and the PC 6 is notified of this L-output from the transmission lines 4816, 4826 through the USB detecting unit 410, the connector unit 412, and the USB cable 8. When the disconnection process is normally terminated, the base band unit 404 issues a normal termination notification, which is sent to the APL controlling unit 406 (step S15). In this case, the notification is performed through the I/F unit 440, the transmission line 4811, and the I/F unit 466.

Figure 12:
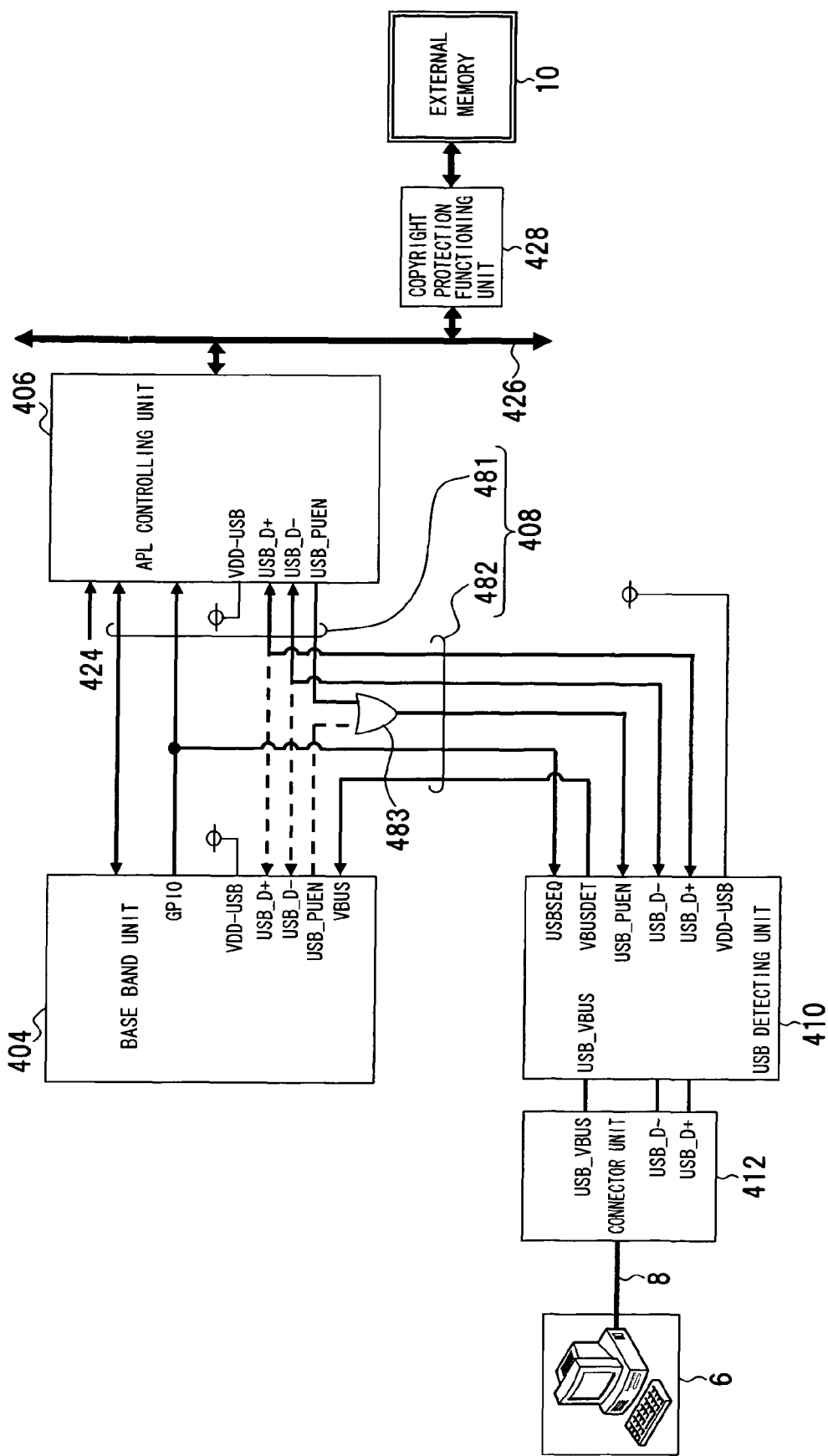
FIG. 12 shows operation of the storage mode.

The APL controlling unit 406 receives the notification and performs USB connection for the PC 6 (step S16). In this case, the data input ports USB_D−, USB_D+ of the USB-I/F unit 462 of the APL controlling unit 460 are switched to the pull-up state, and the loading and input permission of data are set. As a result, the APL controlling unit 406 is set to the storage mode to receive the data from the PC 6 with the APL controlling unit 406 (step S17). FIG. 12 shows the operating state of the storage mode and, in this setting, the data sent from the PC 6 are transferred and written through the APL controlling unit 406 into the external memory 10.

(3) USB Connection Switching Process

Figure 13:
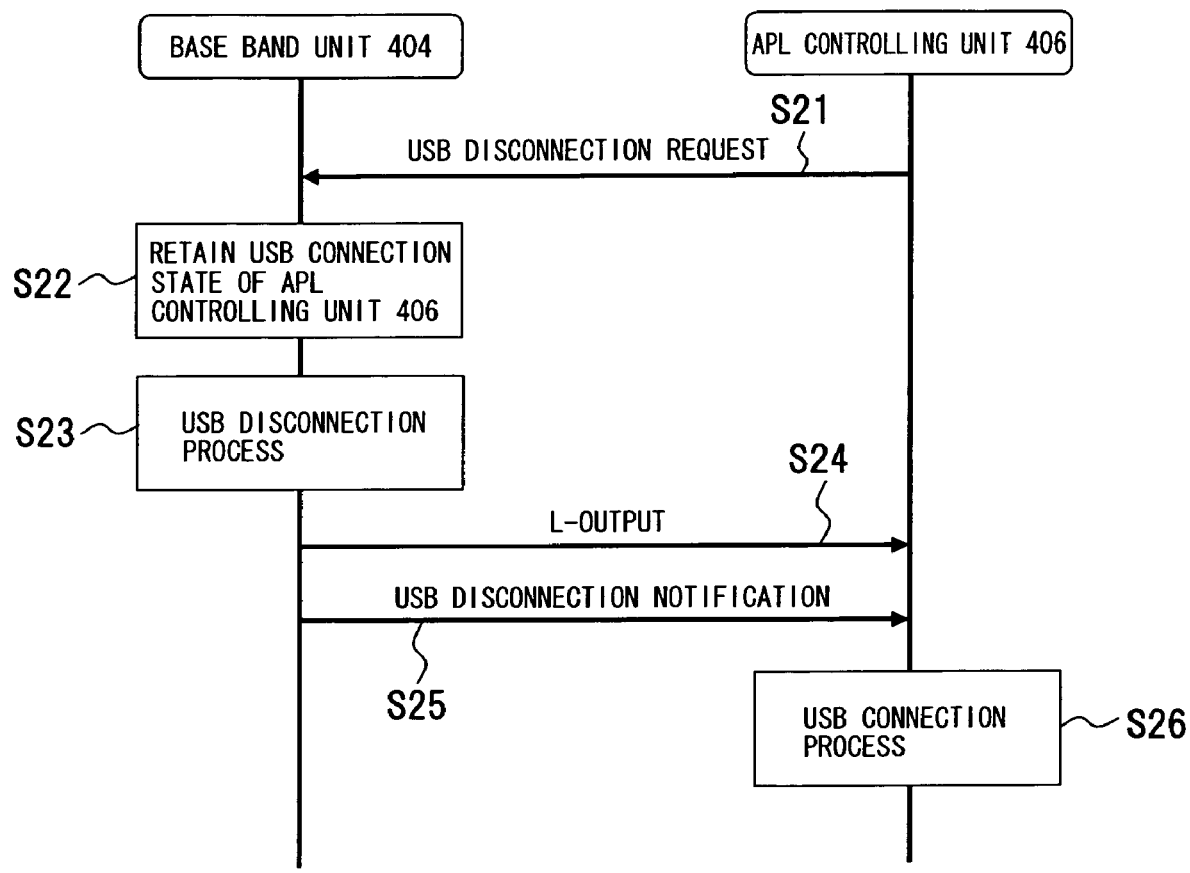
FIG. 13 shows an operation sequence of a connection request of the APL controlling unit.

FIG. 13 shows a USB connection switching process, i.e., a process sequence of the connection of the APL connecting unit 406 associated with the disconnection request of the base band unit 404.

In this USB connection switching process, the base band unit 404 performs the disconnection and connection due to the request from the APL controlling unit 406 through the communication between the base band unit 404 and the APL controlling unit 406. In this case, the base band unit 404 retains the connection state of the APL controlling unit 406 in the storage unit 434.

When the USB connection request is generated from the APL controlling unit 406, the I/F unit 440 of the base band unit 404 is notified of the USB disconnection request from the I/F unit 466 of the APL controlling unit 406 through interruption setting (step S21), and the base band unit 404 retains the USB connection state of the APL controlling unit 406 (step S22) and executes the USB disconnection process for the base band 404 side (step S23). Due to the execution of the disconnection process, the I/F unit 438 issues a level-L pulse output, and when the I/F unit 464 of the APL controlling unit 406 receives the L output through the transmission line 4812, an interruption process is generated (step S24). The USB detecting unit 410 is also notified of the level-L pulse output issued from the I/F unit 438 through the transmission line 4822 and the PC 6 can know the event through this notification. The base band unit 404 issues the USB disconnection notification to the APL controlling unit 406 through the communication between the base band unit 404 and the APL controlling unit 406 (step S25), and the APL controlling unit 406 receives this notification and executes the USB connection process (step S26).

(4) Dialogue Display Process of Displaying unit 416

Figure 14:
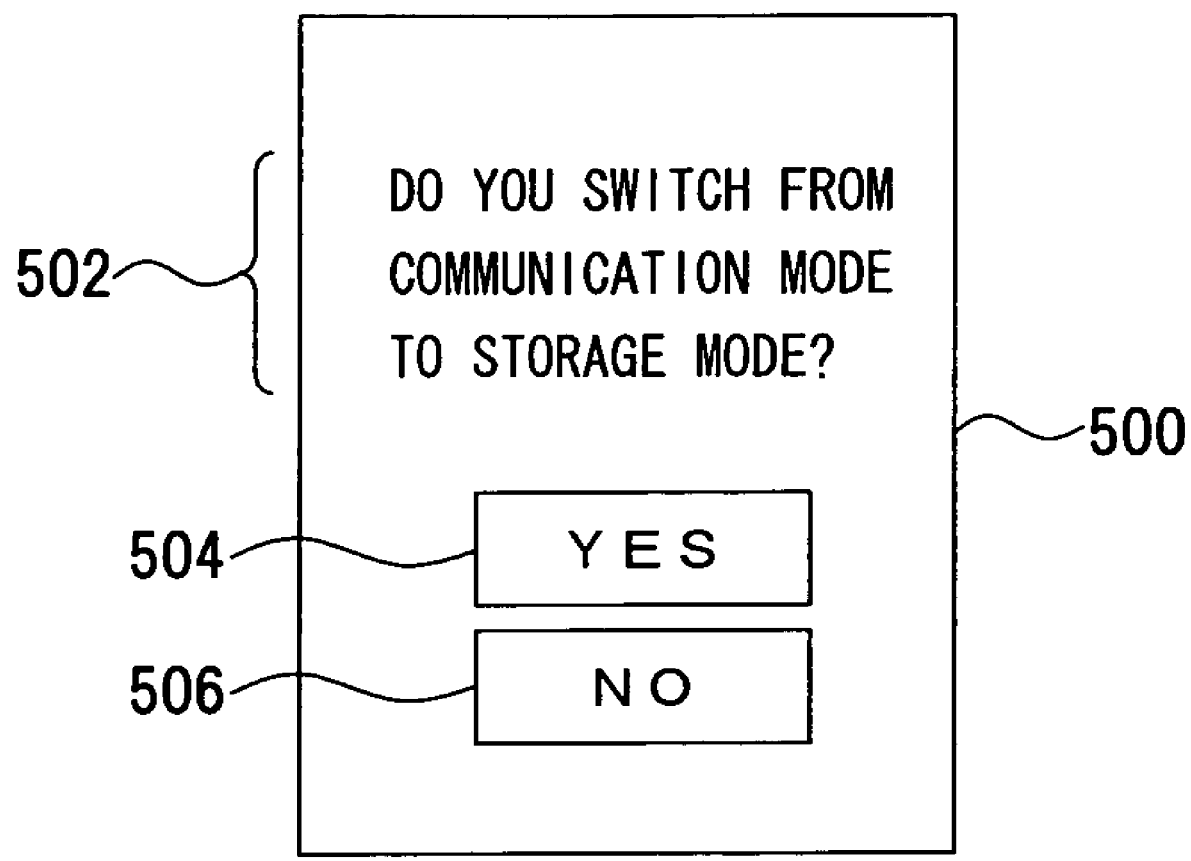
FIG. 14 shows a display example of a displaying unit.

If the communication mode is set by default at the time of the initial power-on, when the connection of the PC 6 is detected, a display screen 500 of the displaying unit 416 is displayed as shown in FIG. 14, and this display screen 500 displays an inquiry message 502 as well as buttons 504, 506. That is, the inquiry message output is generated from the APL controlling unit 406 constituting the inquiry generating unit and the displaying unit 416 displays the inquiry message 502 through the display controlling unit 414. The communication mode can be switched to the storage mode by selecting the button 504 with the cursor keys 492 and pressing the decision key 494. That is, the default setting is canceled. If the button 506 is selected with the cursor keys 492 and the decision key 494 is pressed, the communication mode is maintained and the default setting is maintained.

(5) Communication Mode Switching Sequence, Data Transmission Process

Figure 15:
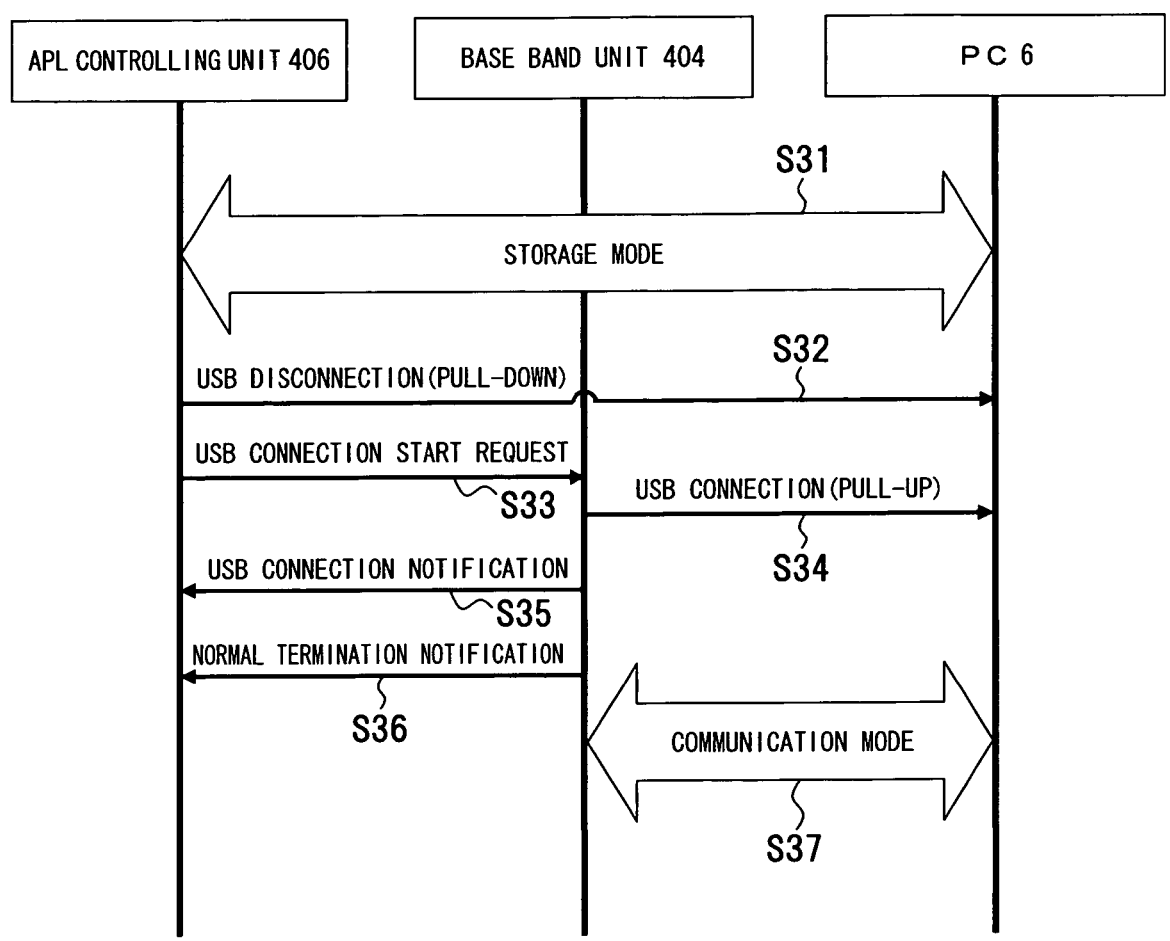
FIG. 15 shows a communication mode switching sequence.

FIG. 15 shows a communication mode switching sequence.

This process is a sequence that switches the storage mode to the communication mode when the storage mode is set. As shown in FIG. 15, the storage mode is set between the APL controlling unit 406 and the PC 6 (step S31), and the communication mode is selected from the menu mode of the portable terminal device 4 as described above to switch the storage mode to the communication mode. When the communication mode is selected, the APL controlling unit 406 performs the USB disconnection (pull-down) for the PC 6 (step S32). In this case, the data input ports USB_D−, USB_D+ of the USB-I/F unit 462 of the APL controlling unit 406 are switched to the pull-down state, i.e., high impedance, and the blocking state is established as the operation of refusing the input of data. When the USB disconnection process is performed, the APL controlling unit 406 issues a USB connection start request to the base band unit 404 (step S33); in response to the request, the base band unit 404 executes the USB connection (pull-up) for the PC 6 (step S34); and after the execution, the base band unit 404 issues a USB connection notification to the APL controlling unit 406 to indicate that the USB connection is executed (step S35). When this USB connection notification is issued, the control output USB_PUEN representing the state of the USB-I/F unit 436 of the base band unit 404 is switched from the level L to the level H, and the PC 6 is notified of this H-output from the transmission lines 4816, 4826 through the USB detecting unit 410, the connector unit 412, and the USB cable 8. When the connection process is normally terminated, the base band unit 404 notifies the APL controlling unit 406 of a normal termination notification (step S36).

Figure 16:
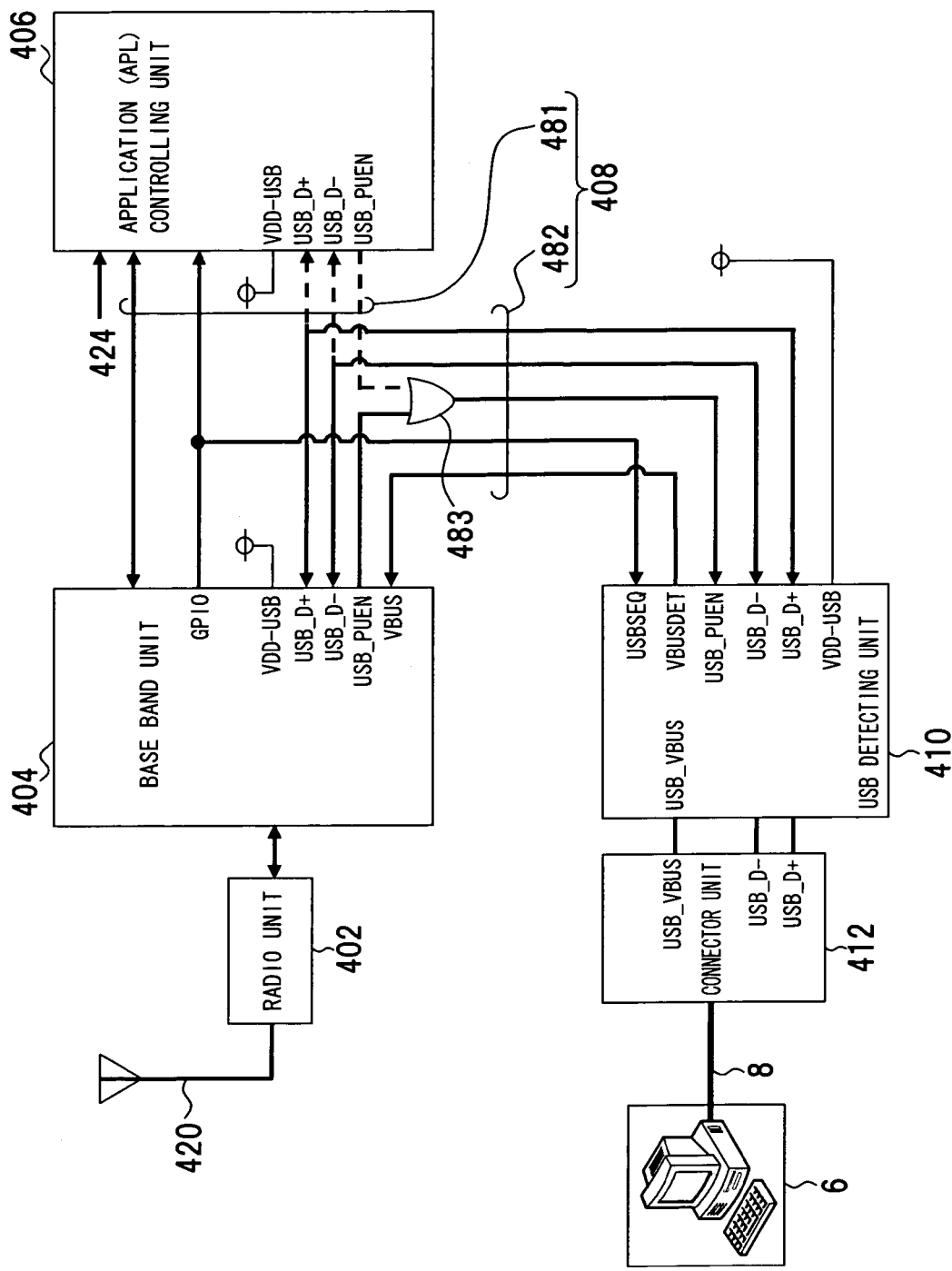
FIG. 16 shows operation of the communication mode.

As a result, the base band unit 404 is set to the communication mode to receive the data from the PC 6 on the base band unit 404 (step S37). FIG. 16 shows the operating state of the communication mode and, in this setting, the data sent from the PC 6 are transmitted through the base band unit 404 to the communication destination from the radio unit 402.

(6) USB Connection Switching Process

Figure 17:
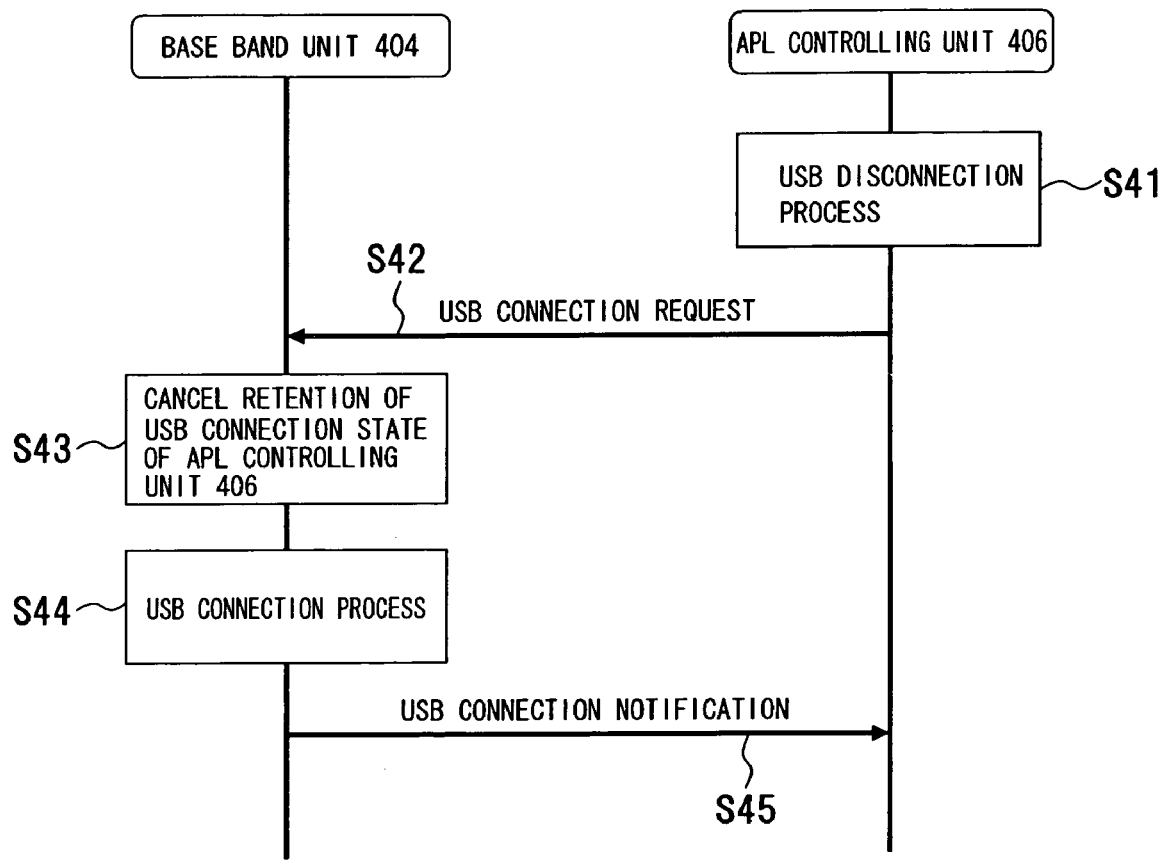
FIG. 17 shows an operation sequence of a connection request of the base band unit.

FIG. 17 shows a USB connection switching process, i.e., a process sequence at the time of the connection request of the base band unit 404 after the disconnection of the APL controlling unit 406.

In this USB connection switching process, the USB disconnection process is executed on the APL controlling unit 406 side (step S41); the USB connection request is performed from the APL controlling unit 406 to the base band unit 404 through the communication between the APL controlling unit 406 and the base band unit 404 (step S42); and the base band unit 404 receives this request, cancels the retention of the USB connection state of the APL controlling unit 406 (step S43), and executes the USB connection process (step S44). After the execution, the base band unit 404 issues the USB connection notification to the APL controlling unit 406 (step S45) and this process is terminated.

As described above, the following advantages can be acquired according to the first embodiment.

a. The base band unit 404 includes the USB-I/F unit 436; the APL controlling unit 406 includes the USB-I/F unit 462; the USB-I/F unit 436 is switched to the active state to accept the data in the communication mode; and the USB-I/F unit 462 is switched to the active state to accept the data in the storage mode. Therefore, the data transmission path is simplified between the data source, i.e., the USB device and the external memory 10 and the data transfer can be accelerated.

b. Since the USB-I/F unit 436 of the base band unit 404 and the USB-I/F unit 462 of the APL controlling unit 406 are connected with the common Y-branched transmission channel 408, the data transmission path is simplified. This simplification also contributes to the acceleration of the data transmission.

c. With regard to the default setting of the USB mode (connection mode of the PC 6 in the embodiment) connecting the base band unit 404 or the APL controlling unit 406 with the USB device, when switching to the communication mode (connection of the base band unit 404) or the storage mode (connection of the APL controlling unit 406), the USB-I/F unit 436 or the USB-I/F unit 462 performs a mask process within the LSI to prevent the data from being mixed and, therefore, the malfunction of the data process can be prevented.

d. Since the data transfer is accelerated for various data such as application data between the portable terminal device 4 and the PC 6, the writing speed to the external memory 10 can be increased, which can contribute to the expansion of the use of the portable terminal device. Since the PC 6 can be directly connected to the APL controlling unit 406 and the USB main clock is high speed, the data transfer of application data, etc., can be accelerated between the portable terminal device 4 and the PC 6, which contributes to the acceleration of the storage process.

[Second Embodiment]

Figure 18:
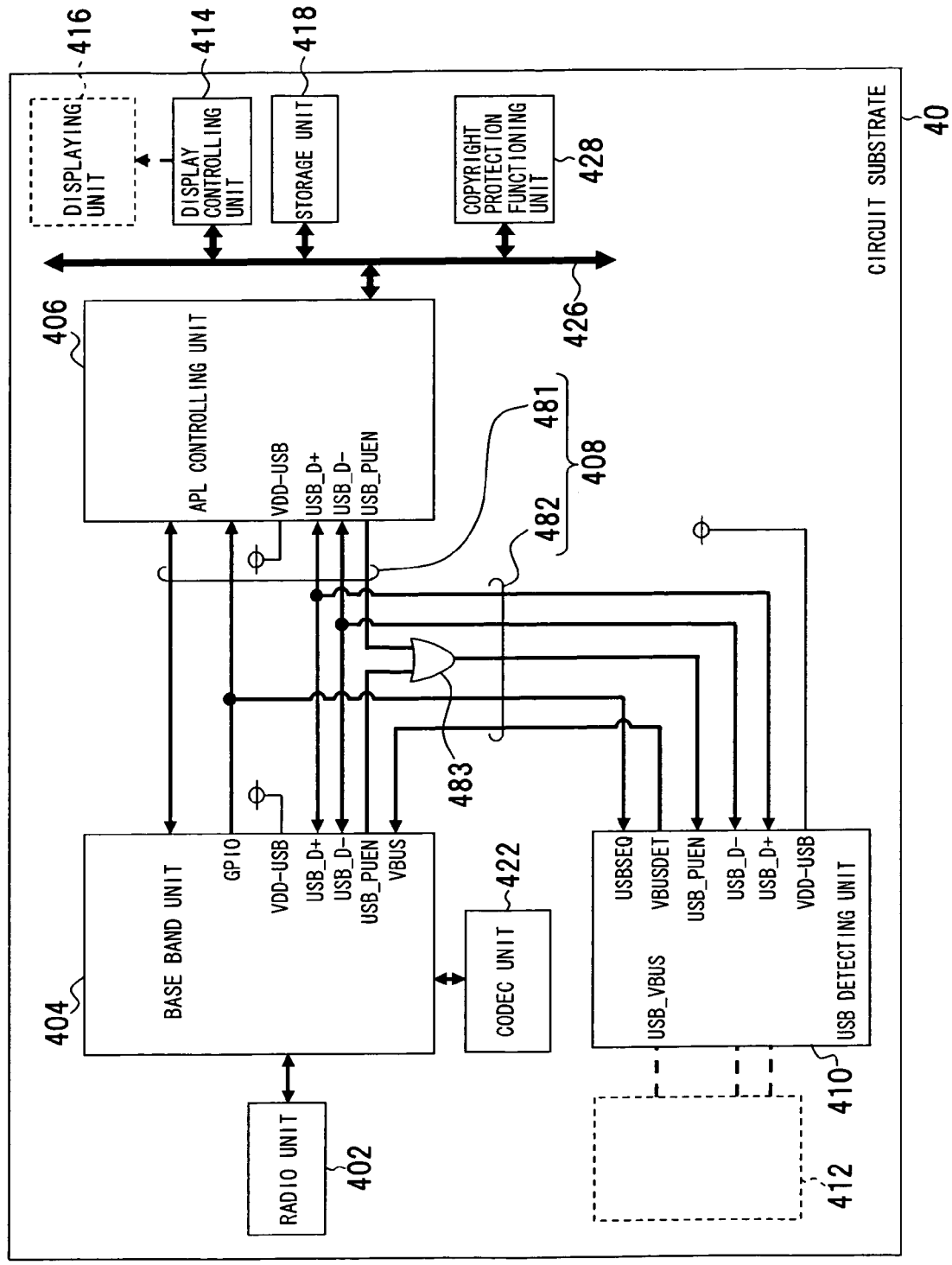
FIG. 18 shows a configuration example of a circuit device according to a second embodiment.

A second embodiment of the present invention will be described with reference to FIG. 18. FIG. 18 shows an example of a circuit device. In FIG. 18, the same reference numerals are added to the same portions as FIG. 1.

This circuit device includes the aforementioned radio unit 402, the base band unit 404, the APL controlling unit 406, the transmitting channel 408, the USB detecting unit 410, the display controlling unit 414, the storage unit 418, the codec unit 422, and the copyright protection functioning unit 428 on a single circuit substrate 40. Such a configuration can be disposed on the aforementioned portable terminal device 4 to realize functions such as the aforementioned data transfer control.

As shown by dotted lines of FIG. 18, the circuit substrate 40 may include the connector unit 412 and the displaying unit 416.

[Third Embodiment]

Figure 19:
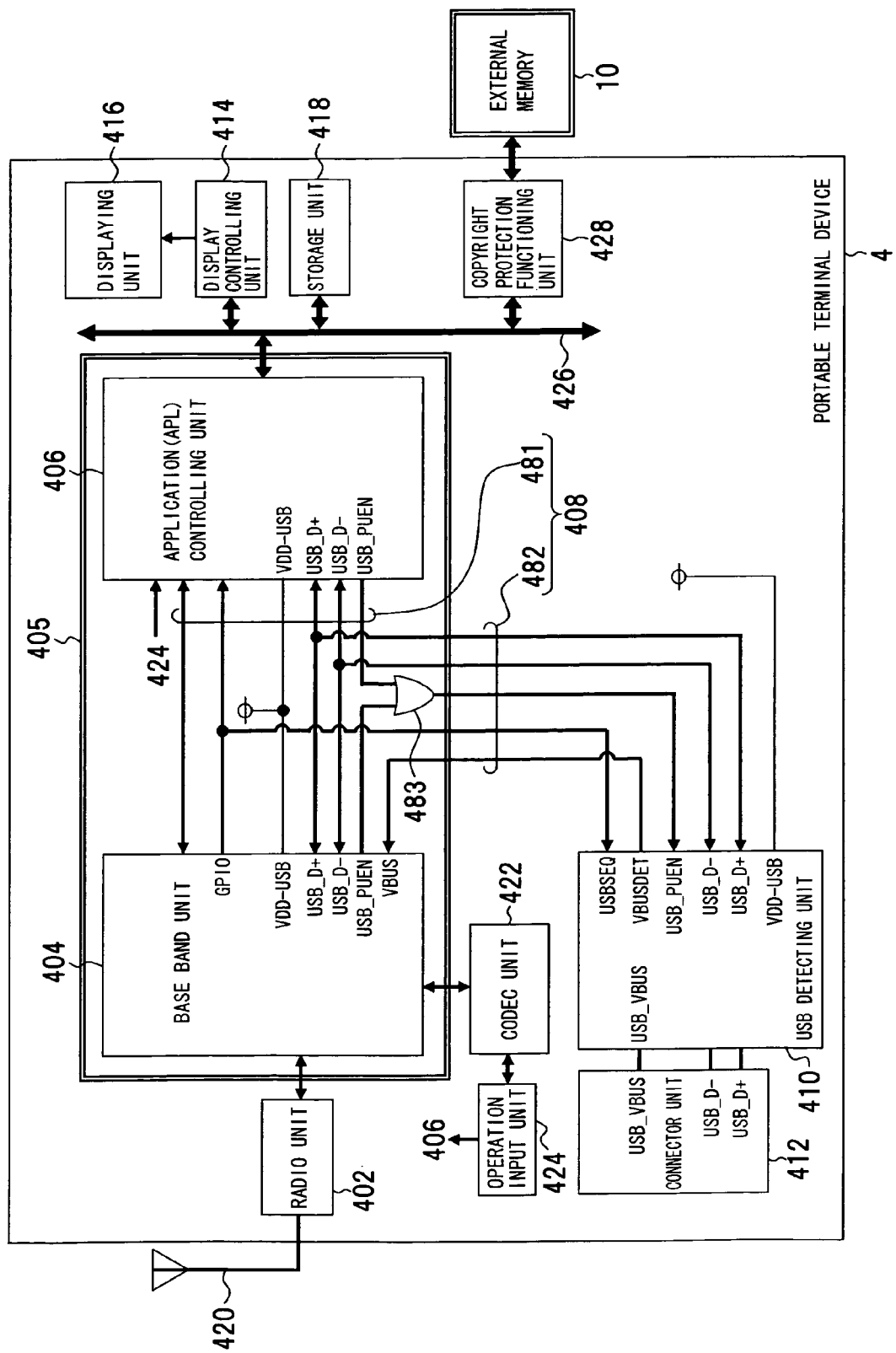
FIG. 19 shows a configuration example of a control circuit chip according to a third embodiment.

A third embodiment of the present invention will be described with reference to FIG. 19. FIG. 19 shows a configuration example of a control circuit chip. In FIG. 19, the same reference numerals are added to the same portions as FIG. 1.

The portable terminal device 4 of this embodiment uses a control circuit chip 405 constituted by integrating the base band unit 404 and the APL controlling unit 406, and this control circuit chip 405 is disposed with a portion of the bus 482 along with the bus 481 of the transmission channel 408 described above.

By using such a control circuit chip 405, various functions such as the aforementioned data transfer control can also be realized.

[Other Embodiment]

Figure 20:
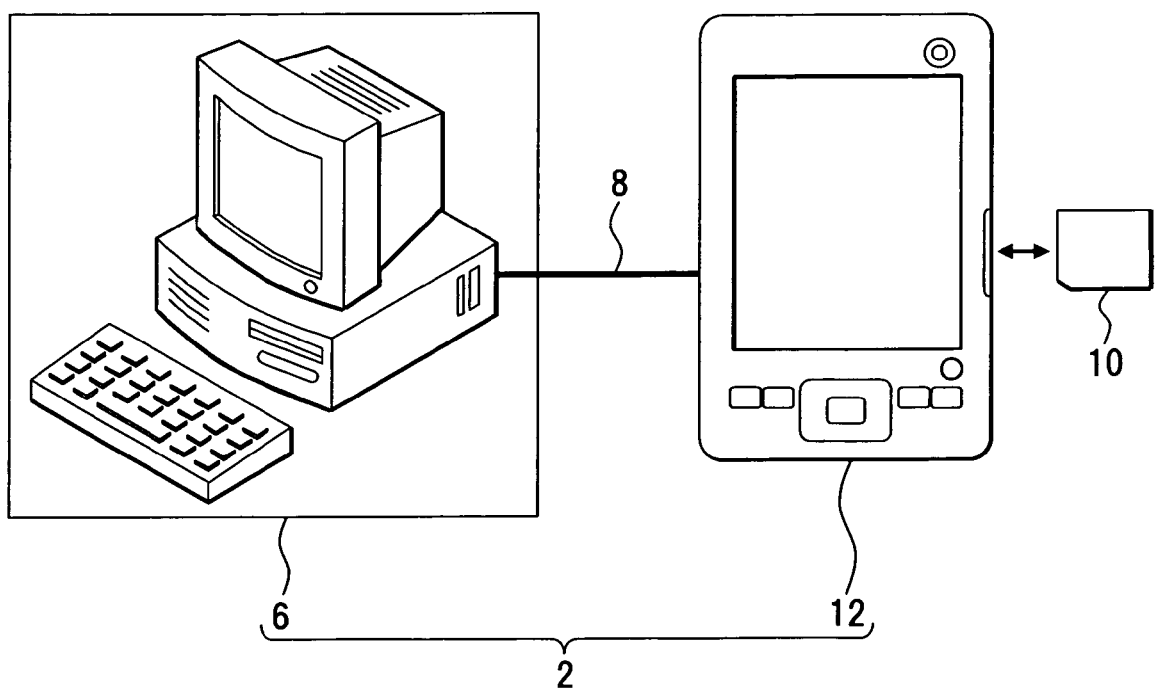
FIG. 20 shows a configuration example of a data transfer system using a PDA according to another embodiment.

(1) Although the portable terminal device 4 constituting a cellular phone is illustrated as the electronic device in the embodiments, the present invention can be applied to a personal digital assistant (PDA) 12 that is an electronic device connected or disposed with the external memory 10, as shown in FIG. 20.

Figure 21:
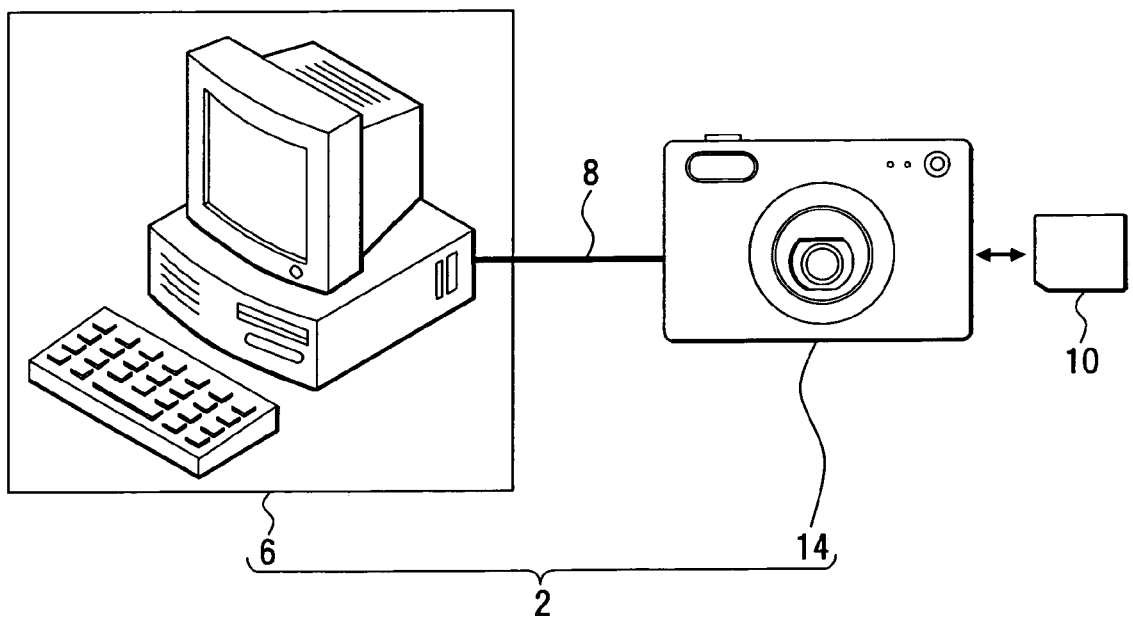
FIG. 21 shows a configuration example of a data transfer system using a digital camera according to another embodiment.

(2) The present invention can be applied to a digital camera 14 that is an electronic device connected or disposed with the external memory 10, as shown in FIG. 21.

(3) The external memory 10 may be connected with the portable terminal device 4 or may be disposed on the portable terminal device 4.

(4) Although description has been mainly made of transferring and writing data through the portable terminal device 4 into the external memory 10 in the embodiments, the present invention can be applied to the case of reading and sending data from the external memory 10 to the external device for acceleration.

(5) Although the communication mode is set, by default, to a normal mode activated at the time of the initial power-on in the embodiments, the storage mode may be activated as the normal mode.

(6) Although the power source unit 411 is built into the USB detecting unit 410 in the embodiments, an external power source may be used to generate the constant output voltage VDD-USB with the response output USBSEQ of the I/F unit 438.

Although the most preferred embodiment, etc., of the present invention have been described as above, the present invention is not limited to the above description and can be modified and altered in many ways by those who skilled in the art based on the gist of the present invention described in claims or disclosed in the specification, of course, and it is needless to say that such modifications and alterations are within the range of the present invention.

The present invention relates to an electronic device disposed or connected with an external storage device such as the SD memory card and can simplify a data transmission path between a data supplying device and an external storage device usefully to achieve acceleration of data transfer and acceleration of writing and reading of data.

What is claimed is:

1. An electronic device connected or disposed with an external storage medium, the electronic device comprising:
    a connector unit that is connected to an external device;
    a transmission channel that is connected to the connector unit to transmit data from the external device;
    a data processing unit that is connected to the transmission channel; and
    a data transferring unit that is connected to the transmission channel, the data transferring unit including a switching function allowing or blocking passage of the data transmitted from the transmission channel, so as in case of writing the data into the external storage medium, the data transferring unit sending a disconnection request to the data processing unit, the disconnection request being for blocking input of the data by making a port of the data processing unit high impedance, and after receiving a disconnection notification from the data processing unit, the data transferring unit allowing passage of the data transmitted from the transmission channel to transfer the data to the external storage medium, wherein the data transferring unit receives a notification that the external device is connected to the connector unit, and generates an inquiry representing whether the data are input to the data processing unit or input to the data transferring unit, based on the notification that the external device is connected to the connector unit, and the data transferring unit allows the passage of the data while the data processing unit is disconnected from the transmission channel and the external device.

2. An electronic device connected or disposed with an external storage medium, the electronic device comprising:
   a connector unit that is connected to an external device;
   a transmission channel that is connected to the connector unit to transmit data from the external device;
   a data processing unit that is connected to the transmission channel; and
   a data transferring unit that is connected to the transmission channel, the data transferring unit including a switching function allowing or blocking passage of the data transmitted from the transmission channel, so as in case of writing the data into the external storage medium, the data transferring unit sending a disconnection request to the data processing unit, the disconnection request being for blocking input of the data by making a port of the data processing unit high impedance, and after receiving a disconnection notification from the data processing unit, the data transferring unit allowing passage of the data transmitted from the transmission channel to transfer the data to the external storage medium, wherein
   the data transferring unit allows the passage of the data while the data processing unit is disconnected from the transmission channel and the external device, and
   the data processing unit includes a switching function receiving or blocking the data, the data processing unit superimposing the data received from the external device through the transmission channel on a carrier signal.

3. The electronic device of claim 1, further comprising:
   a detecting unit that detects whether the external device is connected to the connector unit, wherein the data transferring unit is controlled based on the detection result of the detecting unit.

4. A non-transitory computer-readable medium storing a program comprising instructions, which when executed by a computer, causes the computer to perform:
   receiving a notification that an external device is connected to a connector unit connected to a transmission channel, the transmission channel being connected to the connector unit, a data transferring unit and a data processing unit that processes delivery of data sent from the external device which is connected;
   generating an inquiry representing whether the data are input to the data processing unit or input to the data transferring unit, based on the notification that the external device is connected to the connector unit;
   sending a disconnection request to the data processing unit, the disconnection request being for blocking input of the data by making a port of the data processing unit high impedance, from the data transferring unit;
   allowing passage of the data sent from the external device, at the data transferring unit after sending the disconnection request to the data processing unit and after receiving a disconnection notification from the data processing unit; and
   transferring the data received from the external device to an external storage medium,
   wherein the passage of the data sent from the external device is allowed while the data processing unit is disconnected from the external device.

5. The non-transitory computer-readable medium of claim 4, the program further comprising instructions, which when executed by the computer, causes the computer to perform:
   generating display of the inquiry.

6. A circuit chip of an electronic device connected or disposed with an external storage device, the circuit chip comprising:
   a data transferring unit that is connected to a transmission channel, the data transferring unit including a switching function allowing or blocking passage of data which is transmitted from the transmission channel, so as in case of writing the data into the external storage device, the data transferring unit sending a disconnection request to a data processing unit, the disconnection request being for blocking input of the data by making a port of the data processing unit high impedance, the data processing unit being connected via the transmission channel, and after receiving a disconnection notification from the data processing unit, the data transferring unit allowing passage of the data transmitted from the transmission channel to transfer the data to the external storage device, wherein
   the data transferring unit receives a notification that an external device is connected to a connector unit that is connected to the transmission channel, and generates an inquiry representing whether the data are input to the data processing unit or input to the data transferring unit, based on the notification that the external device is connected to the connector unit, and
   the data transferring unit allows the passage of the data while the port of the data processing unit is made to be high impedance.

7. A circuit chip of an electronic device connected or disposed with an external storage device, the circuit chip comprising:
   a data transferring unit that is connected to a transmission channel, the data transferring unit including a switching function allowing or blocking passage of data which is transmitted from the transmission channel, so as in case of writing the data into the external storage device, the data transferring unit sending a disconnection request to a data processing unit, the disconnection request being for blocking input of the data by making a port of the data processing unit high impedance, the data processing unit being connected via the transmission channel, and after receiving a disconnection notification from the data processing unit, the data transferring unit allowing passage of the data transmitted from the transmission channel to transfer the data to the external storage device, wherein
   the data transferring unit allows the passage of the data while the port of the data processing unit is made to be high impedance, and
   the data processing unit is connected to the transmission channel, and includes a switching function receiving or blocking the data, the data processing unit superimposing the data received from an external device through the transmission channel on a carrier signal.

* * * * *